United States Patent
Kato et al.

(10) Patent No.: US 8,693,346 B2
(45) Date of Patent: *Apr. 8, 2014

(54) ON-VEHICLE GATEWAY DEVICE, METHOD FOR CONTROLLING AN ON-VEHICLE GATEWAY DEVICE, CONNECTION DEVICE AND CONNECTION CONTROL METHOD

(75) Inventors: Hiromitsu Kato, Yokohama (JP); Akitoshi Shimura, Yokohama (JP); Eriko Ando, Yokohama (JP); Takeiki Aizono, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 13/354,059

(22) Filed: Jan. 19, 2012

(65) Prior Publication Data

US 2012/0116633 A1 May 10, 2012

Related U.S. Application Data

(63) Continuation of application No. 12/068,538, filed on Feb. 7, 2008, now Pat. No. 8,139,493.

(30) Foreign Application Priority Data

Feb. 7, 2007 (JP) ................................ 2007-027916
Mar. 12, 2007 (JP) ................................ 2007-061527

(51) Int. Cl.
*H04J 1/16* (2006.01)

(52) U.S. Cl.
USPC ............ 370/241; 370/401; 709/224; 709/225

(58) Field of Classification Search
USPC ........................... 370/241, 401; 709/224, 225
See application file for complete search history.

(56) References Cited

U.S. PATENT DOCUMENTS

| 7,809,481 B2 | 10/2010 | Okada et al. |
| 2003/0117298 A1 | 6/2003 | Tokunaga et al. |
| 2003/0227379 A1 | 12/2003 | Itou |

(Continued)

FOREIGN PATENT DOCUMENTS

| EP | 1244252 A1 | 9/2002 |
| EP | 1 309 132 A1 | 5/2003 |

(Continued)

OTHER PUBLICATIONS

Korean Office Action issued in Korean Patent Application No. KR 10-2008-0011963, dated May 25, 2009.

(Continued)

*Primary Examiner* — Andrew Lee
(74) *Attorney, Agent, or Firm* — McDermott Will & Emery LLP

(57) ABSTRACT

An on-vehicle gateway device connected to an information system network and a control system network of a vehicle executes monitoring the status of an information system via an information system access circuit taking charge of message transmission and reception to and from the information system network, and an information system management step to manage information acquired by the information system monitoring, monitoring the status of a control system via a control system access circuit taking charge of message transmission and reception to and from the control system network, and a control system management step to manage information acquired by the control system monitoring, managing policies for access control by the access control circuit controlling data flows between the information system access circuit and the control system access circuit, and determining whether or not to update the policies managed by policy management and to update the policies.

10 Claims, 21 Drawing Sheets

(56) References Cited

U.S. PATENT DOCUMENTS

| | | |
|---|---|---|
| 2004/0148404 A1 | 7/2004 | Muroya et al. |
| 2005/0001566 A1 | 1/2005 | Bell |
| 2005/0032502 A1 | 2/2005 | Tokudome |
| 2007/0083305 A1 | 4/2007 | Okada et al. |
| 2007/0124039 A1 | 5/2007 | Sakurai et al. |
| 2007/0135978 A1 | 6/2007 | Kim et al. |
| 2007/0299587 A1 | 12/2007 | Breed et al. |
| 2010/0207754 A1 | 8/2010 | Shostak et al. |

FOREIGN PATENT DOCUMENTS

| | | |
|---|---|---|
| EP | 1 734 693 A1 | 12/2006 |
| JP | 2000-57484 | 2/2000 |
| JP | 2000-156685 | 6/2000 |
| JP | 2000-156685 A | 6/2000 |
| JP | 2000-349780 | 12/2000 |
| JP | 2002-16614 | 1/2002 |
| JP | 2002-118574 | 4/2002 |
| JP | 2002-118574 A | 4/2002 |
| JP | 2003-309581 | 10/2003 |
| JP | 2003-309581 A | 10/2003 |
| JP | 2003-324458 | 11/2003 |
| JP | 2003-324458 A | 11/2003 |
| JP | 2004-179772 | 6/2004 |
| JP | 2004-192278 | 7/2004 |
| JP | 2004-192278 A | 7/2004 |
| JP | 2005-219717 A | 8/2005 |
| JP | 2006-226805 A | 8/2006 |
| JP | 2006-253922 | 9/2006 |
| JP | 2006-287738 | 10/2006 |
| JP | 2006-340099 | 12/2006 |
| WO | WO-01/45329 A1 | 6/2001 |
| WO | WO 02/087165 | 10/2002 |
| WO | WO 02/087165 A1 | 10/2002 |

OTHER PUBLICATIONS

Chinese Office Action issued in Chinese Patent Application No. 200810005515.5, mailed Oct. 13, 2010.

Japanese Office Action, issued in Japanese Patent Application No. 2007-027916, dated Oct. 4, 2011.

European Search Report issued in European Patent Application No. EP 08002065 dated Nov. 27, 2008.

Entire Prosecution of U.S. Appl. No. 12/068,538 to Hiromitsu Kato et al. filed Feb. 7, 2008, entitled, "On-Vehicle Gateway Device, Method for Controlling an On-Vehicle Gateway Device, Connection Device and Connection Control Method."

Japanese Office Action issued in Japanese Application No. 2007-027916 issued on Mar. 6, 2012.

Nori Matsuda et al., "Design and Implementation of Secure Java Platform for Telematics Servers with Context-dependent Access Control", Information Processing Society of Japan, Dec. 15, 2005, vol. 46, No. 12, pp. 2988-2996.

Japanese Office Action issued in Japanese Application No. JP 2011-263358 dated Apr. 2, 2013.

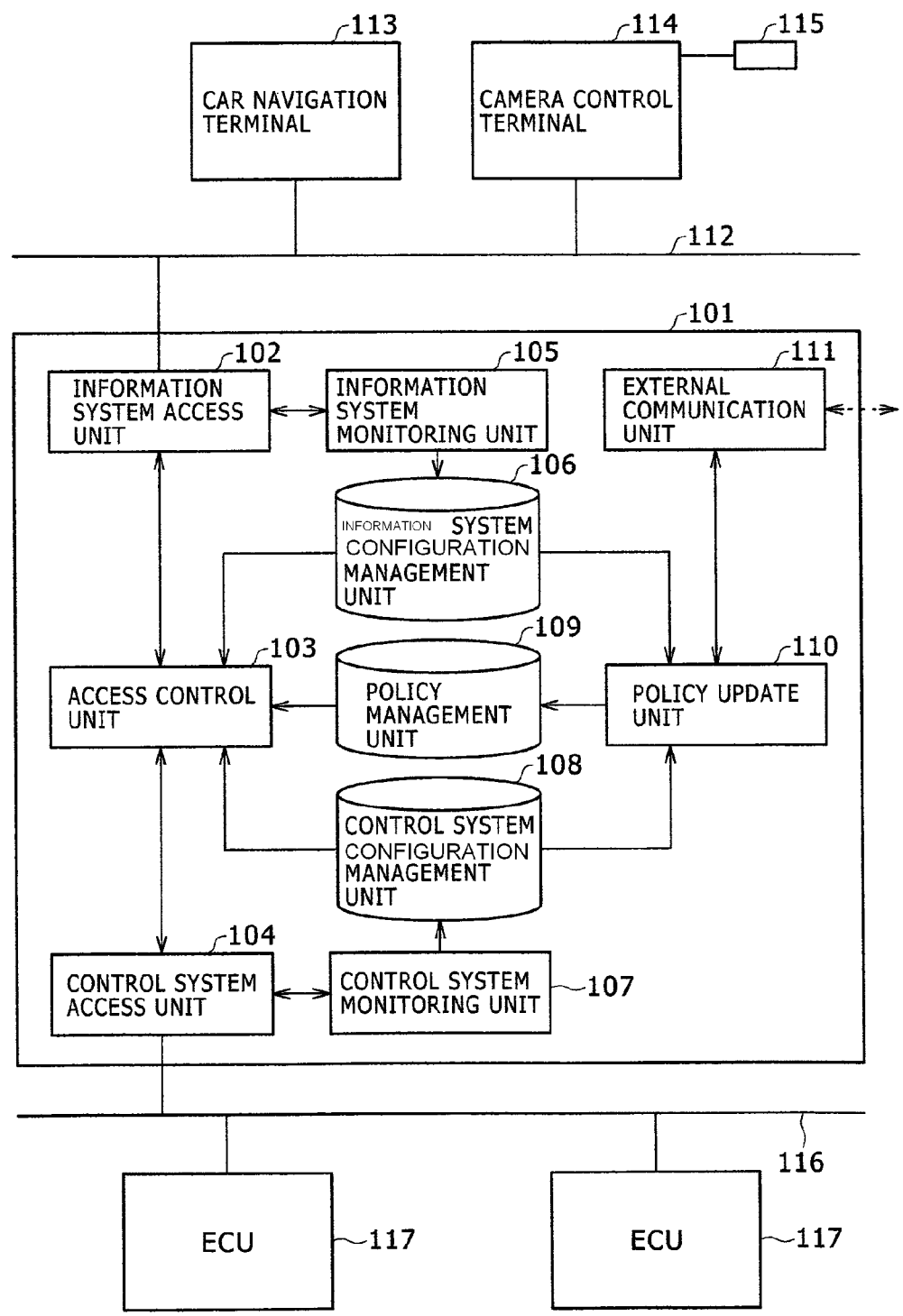

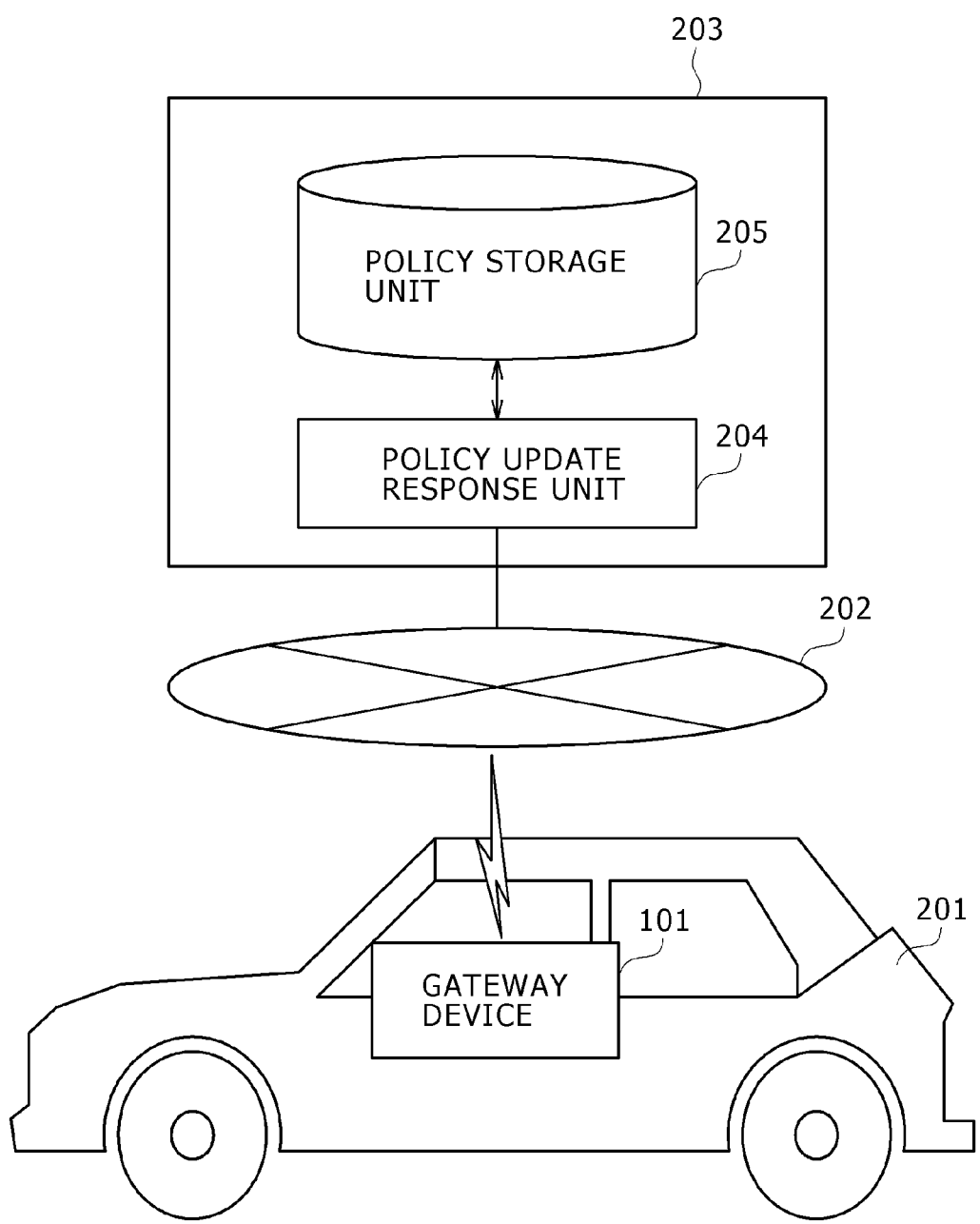

| PART NAME | HARDWARE IDENTIFIER | | SOFTWARE IDENTIFIER | | STATUS | TIME STAMP |
|---|---|---|---|---|---|---|
| | THIS TIME | LAST TIME | THIS TIME | LAST TIME | | |
| INFORMATION SYSTEM LAN | — | — | — | — | NOTHING WRONG | 16:32:54.950 05/17/2006 |
| NAVIGATION | 0123 | 0123 | 001 | 001 | NOTHING WRONG | |
| CAMERA CONTROL | 1234 | 1234 | 003 | 003 | DIAGNOSTIC TROUBLE CODE :C0123 | |
| ... | | ... | | ... | ... | |

| PART NAME | HARDWARE IDENTIFIER | | SOFTWARE IDENTIFIER | | STATUS | TIME STAMP |
|---|---|---|---|---|---|---|
| | THIS TIME | LAST TIME | THIS TIME | LAST TIME | | |
| CONTROL SYSTEM LAN | — | — | — | — | LOAD: 62% | 08:14:39.120 05/17/2006 |
| ECU1 | 9876 | 9876 | 001 | 001 | DIAGNOSTIC TROUBLE CODE :P0102 | |
| BATTERY | — | — | — | — | VOLTAGE 10V | |
| ... | | ... | | ... | ... | |

401 402 403 404 405

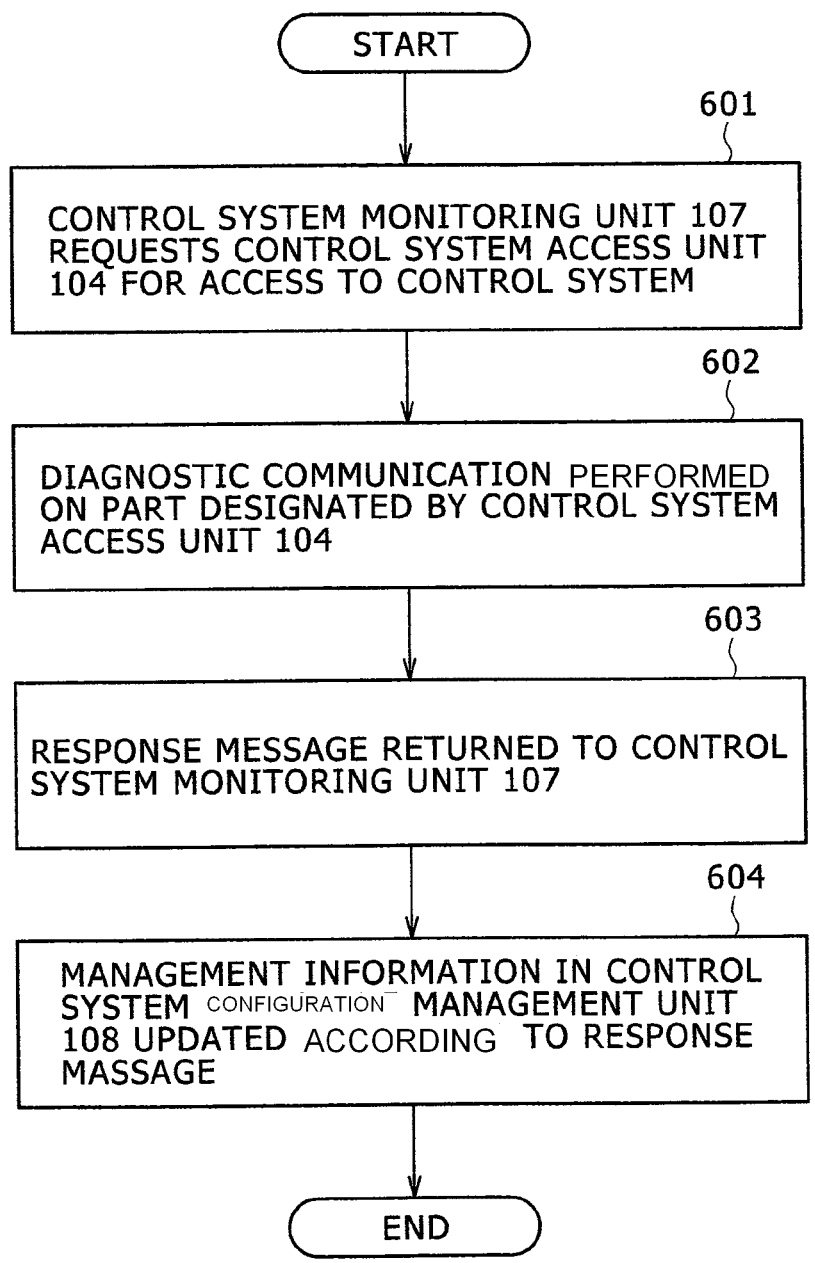

(A) ACCESS CONTROL RULES

| SERIAL NO. | CAN ID | SERVICE ID | PARAMETER | ACCESS PERMIT CONDITIONS | WHEN INACCESSIBLE |
|---|---|---|---|---|---|
| 1 | | | | 1 | REFUSE ACCESS |
| 2 | | | | 2 AND 3 | STOP SYSTEM |
| 3 | | | | | |
| ... | ... | ... | ... | | |

(B) ACCESS PERMIT CONDITIONS

| SERIAL NO. | PART | HARDWARE IDENTIFIER | SOFTWARE IDENTIFIER | STATUS |
|---|---|---|---|---|
| 1 | ECU1 | 9876 | 002 | NOTHING WRONG |
| 2 | CONTROL SYSTEM LAN | — | — | LOAD 60% OR LESS |
| 3 | BATTERY | — | — | VOLTAGE 8V OR ABOVE |
| ... | ... | ... | ... | ... |

(C) ACCESS CONVERSION RULES

| SERIAL NO. | CAN ID | CHECK LIST | | | CAN ID CONVERSION RULES |
|---|---|---|---|---|---|
| | | PART NAME | HARDWARE IDENTIFIER | SOFTWARE IDENTIFIER | |
| 1 | 10D | ECU1 | 9876 | 005 | 21A |
| 2 | | | | | |
| 3 | | | | | |
| ... | ... | ... | ... | | |

FIG. 17

| PRIORITY LEVEL 10312 | TIMER COUNT 10313 | NUMBER OF TRANSMISSIONS 10314 | IDENTIFIER 10315 | DATA POINTER 10316 |
|---|---|---|---|---|
| 0 | 100 | 1 | #10 | H'FFFF4000 |
| 1 | 1000 | 10 | #20 | H'FFFF4016 |
| ⋮ | | | | |
| N | 500 | 5 | #30 | H'FFFF4096 |

10311

HIGH ← → LOW

FIG. 18

| ITEM 10322 | STATUS 10323 |
|---|---|
| NETWORK LOAD FACTOR | 54% |
| VOLTAGE | 11.8V |

10321

| ITEM | STATUS |
|---|---|
| NETWORK LOAD FACTOR | 54% |
| VOLTAGE | 11.8V |
| QUANTITY OF DATA TRANSMITTED | 13 |

ON-VEHICLE GATEWAY DEVICE, METHOD FOR CONTROLLING AN ON-VEHICLE GATEWAY DEVICE, CONNECTION DEVICE AND CONNECTION CONTROL METHOD

RELATED APPLICATIONS

The present application is a Continuation of U.S. application Ser. No. 12/068,538 filed on Feb. 7, 2008, now U.S. Pat. No. 8,139,493 which claims priority from Japanese applications serial no. 2007-027916 filed on Feb. 7, 2007 and serial no. 2007-061527 filed on Mar. 12, 2007, the contents of which are hereby incorporated by reference into this application.

FIELD OF THE INVENTION

The present invention relates to an on-vehicle gateway device, a control method thereof, and a data transfer method using thereof, and more particularly to management of co-working of an information system and a communication system in a gateway device to be connected to the information system and the communication system of a vehicle.

DESCRIPTION OF RELATED ART

In recent years, requirements for greater safety and reduced environmental loads of motor vehicles are becoming ever more stringent. To meet these requirements, mere addition of closed functions to or performance improvement of the vehicle control system in conventional ways is nearing its limit, but running control linking information system hardware, such as car navigation, with information provided from the road side is needed, and initiatives in the Intelligent Transportation system (ITS) are increasingly important. Also, remote emergency support service using telematics to cope with accidents or troubles and to prevent theft has become available for practical use, and in these services co-working of the information system and the control system of vehicles is taking on increasing importance.

The control system and the information system of vehicles differ in the level of reliability, and therefore connecting the two systems requires adequate care not to affect the safety of vehicle control.

In this regard, JP-A 2000-349780 discloses a device which has plural gates each assigned a different level of priority from others, determines on the basis of the external situation or information from an authorizing organization the gate of which level of priority is to be passed and performs access control accordingly. JP-A 2000-057484 discloses a mechanism in which the bus line is divided between the running system and the non-running system and a gateway selects and outputs ITS information.

Further, for supplying information from an external device, such as a car navigation device, to a control system network used for providing control information for the control of the engine and other equipment, a gateway device is used.

Not to adversely affect communication in the control system network, a technique described in the U.S. Patent Laid-Open No. 2003/0117298 (JP-A 2002-16614), for example, a gateway device is arranged between a first network which is the network of an engine control system and a second network which is the network of a body control system and, when information is to be passed from the second network to the first network, vehicle statuses including the power supply status, engine status, brake status, running status and trouble status of mounted equipment are monitored to pass the information according to the monitor findings.

SUMMARY OF THE INVENTION

Incidentally, when some abnormality arises between the control system and the information system of a vehicle, co-working between them is considered undesirable. However, none of the references cited above discusses watching means or access control means against abnormalities.

Furthermore, a vehicle is usually supposed to operate for a long period, such as 15 years or so, the hardware and software of parts are highly likely to be replaced more up-to-date items. Especially, the parts of the information system, typically the car navigation system, have only short life cycles. Therefore, in considering the co-working of the control system and the information system of vehicles in the future, it is considered essential to assess the compatibility between different versions of hardware and software and to perform access control accordingly. However, none of the references cited above discusses this point either.

An object of the present invention is to provide an on-vehicle gateway device which can achieve co-working of the information system and the control system of vehicles in response to changes in the status and configuration thereof, an applicable vehicle, a control method thereof and a program therefore.

A technique described in the U.S. Patent Laid-Open No. 2003/0117298 (Corresponding JP-A 2002-16614), adverse effects on the control system network are prevented, when the status of the first network which is the network of the control system is not in a stable state, by not allowing information transmitted from the second network to pass the first network and discarding it.

For this reason, when for instance a vehicle is to be controlled by using information transmitted from equipment connect to the second network, which is the network of the information system, discarding of information transmitted from the second network may rather adversely affect the control of the vehicle.

Therefore, another object of the invention is to provide a gateway device which supplies information from a device outside the control system network to the control system network without adversely affecting the control system network.

An on-vehicle gateway device according to the invention should preferably be an on-vehicle gateway device to be connected to the information system network and the control system network of a vehicle, including an information system access unit taking charge of message transmission and reception to and from the information system network, a control system access unit taking charge of message transmission and reception to and from the control system network, an access control unit controlling data flows between the information system access unit and the control system access unit, a policy management unit managing policies for access control by the access control unit, an information system monitoring unit monitoring the status of the information system via the information system access unit, an information system configuration management unit managing information acquired by the information system monitoring unit, a control system monitoring unit monitoring the status unit of the control system via the control system access unit, a control system configuration management unit managing information acquired by the control system monitoring unit, and a policy update unit determining whether or not to update the policies managed by the policy management unit and updating the policies.

In another preferable configuration, the information system configuration management unit and the control system configuration management unit have memory units including a first memory unit to store the part name, the part identifier and the part status of the information system, a second memory unit to store the current value and the immediately preceding value of the part identifier, and a third memory unit to store the time at which the part status is updated as a time stamp.

In another preferable configuration, the information system monitoring unit has means to acquire a diagnostic trouble code which a car navigation terminal connected to the information system network holds as a result of self-diagnosis or means to perceive any abnormality of a message issued by the car navigation terminal.

In another preferable configuration, the control system monitoring unit has means to acquire a battery voltage from a message flowing over the control system network.

In another preferable configuration, the policy management unit, as access control rules thereof, holds and manages information representing the address and contents of a message, information to designate conditions for permitting access to the message, and information to designate a response to be taken in the event that the access is not permitted.

In another preferable configuration, the policy management unit, as access conversion rules thereof, holds and manages information, information for identifying the original message, a check list for determining whether or not to perform conversion at the time of access, and rules for converting a message, and the check list includes the contents of the information system configuration management unit or the control system configuration management unit.

In another preferable configuration, the access control unit acquires from the information system access unit a message from the information system network, the access control unit acquires a policy from the policy management unit, checks information of the information system configuration management unit in accordance with the policy, checks information of the control system configuration management unit in accordance with the policy, determines whether or not to permit access, determines whether or not conversion of the message is needed if access is permitted and converts a transmission message in accordance with the access conversion rules if conversion is needed, the control system access unit transmits a message to the control system network, and has means which, if the determination of whether or not to permit access results in refusal of access, executes the response to be taken in accordance with the access control rules in the event that the access is not permitted.

In another preferable configuration, the policy update unit checks the information system configuration management unit and the control system configuration management unit to ascertain whether there is no change in the part identifier; makes an inquiry, if there is any change in either, with a center server about the part identifier of the constituent part in which a change has occurred; acquires the policy acquired with the part identifier as the key; and has means to update the contents of the policy management unit with a new policy that has been acquired.

In another preferable configuration, the policy update unit has means to acquire from the center server information of a recommended applicable system, to compare information of the recommended applicable system with at least one of the information system configuration management unit and the control system configuration management unit and, if there is any difference, to give a notice to urge necessary system updating.

A program according to the invention is a program to be executed by a computer mounted on an on-vehicle gateway device connected to the information system network and the control system network of a vehicle, including an information system access function taking charge of message transmission and reception to and from the information system network, a control system access function taking charge of message transmission and reception to and from the control system network, an access control function controlling data flows between the information system access function and the control system access function, a policy management function managing policies for access control by the access control function, an information system monitoring function monitoring the status of the information system via the information system access function, an information system configuration management function managing information acquired by the information system monitoring function, a control system monitoring function monitoring the status of the control system via the control system access function, a control system configuration management function managing information acquired by the control system monitoring function, and a policy update function determining whether or not to update the policies managed by the policy management function and updating the policies.

A control method according to the invention is a control method for an on-vehicle gateway device connected to the information system network and the control system network of a vehicle, including an information system monitoring step to monitor the status of the information system via an information system access unit taking charge of message transmission and reception to and from the information system network, an information system management step to manage information acquired by the information system monitoring, a control system monitoring step to monitor the status of the control system via a control system access unit taking charge of message transmission and reception to and from the control system network, a control system management step to manage information acquired by the control system monitoring, a policy management step to manage policies for access control by the access control unit controlling data flows between the information system access unit and the control system access unit, and a policy update step to determine whether or not to update the policies managed by policy management and to update the policies.

A vehicle according to the invention should preferably be a vehicle having an on-vehicle gateway device, information system equipment connected to the on-vehicle gateway device via an information system network, and control system equipment connected to the on-vehicle gateway device via a control system network, wherein the on-vehicle gateway device has an information system access unit taking charge of message transmission and reception to and from the information system network, a control system access unit taking charge of message transmission and reception to and from the control system network, an access control unit controlling data flows between the information system access unit and the control system access unit, an information system monitoring unit monitoring the status of the information system via the information system access unit, an information system configuration management unit managing information acquired by the information system monitoring unit, a control system monitoring unit monitoring the status unit of the control system via the control system access unit, a control system configuration management unit managing information acquired by the control system monitoring unit, and a policy update unit determining whether or not to update the policies managed by the policy management unit and updating the policies, the information system monitoring unit monitoring any change in the status of equipment connected to the information system network, bringing acquired information to reflection in the control system management unit, and the policy update unit monitoring any change in the information system management unit or the control system management unit to update policies of the policy management unit.

The invention makes possible, by periodically monitoring the information system and the control system of the vehicle, to perform access control to intercept or convert mutual access between the information system and the control system if any mismatching occurs in the co-working of the two systems. In this way, co-working of the information system and the control system can be effectively accomplished without adversely affecting the safety or stability of vehicle control.

Further to solve the problems noted above, the invention uses a transfer arrangement by which information from another device is transferred when the status of the control system network is stable and stands by for a transfer if the status is unstable.

For instance, a connection device according to the invention for connection to the network of a control system an external device of that network is a connection device provided with a memory unit to store data transmitted from the external device to the control system and a control unit, wherein the control unit performs processing to determine whether or not the control system is stable, and processing to transmit, if the control system is determined to be stable, data stored in the memory unit to the control system.

Or for instance, a connection control method according to the invention is intended for connecting, in a connection device provided with a memory unit and a control unit, to a control system network an external device of that network, and carrying out a process of storing data transmitted from the external device to the control system into a memory unit, a process by the control unit to determine whether or not the control system is stable, and a process of transmitting data stored in the memory unit to the control system if the control unit determines that the control system is stable.

Also for instance, in a vehicle equipped with a connection device for connection to a control system network an external device of that network, the connection device is provided with a memory unit to store data transmitted from the external device to the control system and a control unit, wherein the control unit performs processing to determine whether or not the control system is stable, and processing to transmit, if the control system is determined to be stable, data stored in the memory unit to the control system.

Further, the invention can provide a gateway device to supply a control system network with information from an external device of the control system network without adversely affecting the control system network.

BRIEF DESCRIPTION OF THE DRAWINGS

FIG. 1 shows the configuration of a gateway device in a preferred embodiment of the invention and an on-vehicle system including the same;

FIG. 2 shows the configuration of a total system for co-working of a gateway device and a center server;

FIG. 3 shows the table structure of an information system configuration management unit 106;

FIG. 4 shows the table structure of a control system configuration management unit 108;

FIG. 6 is a flow chart of processing to update the contents of the control system configuration management unit 108;

FIG. 7 shows the table structure of a policy management unit 109;

FIG. 17 shows the configuration of a data management table in the second embodiment of the invention;

FIG. 18 shows the configuration of a vehicle status management table in the second embodiment of the invention;

DETAILED DESCRIPTION OF THE PREFERRED EMBODIMENTS

Figure 5:
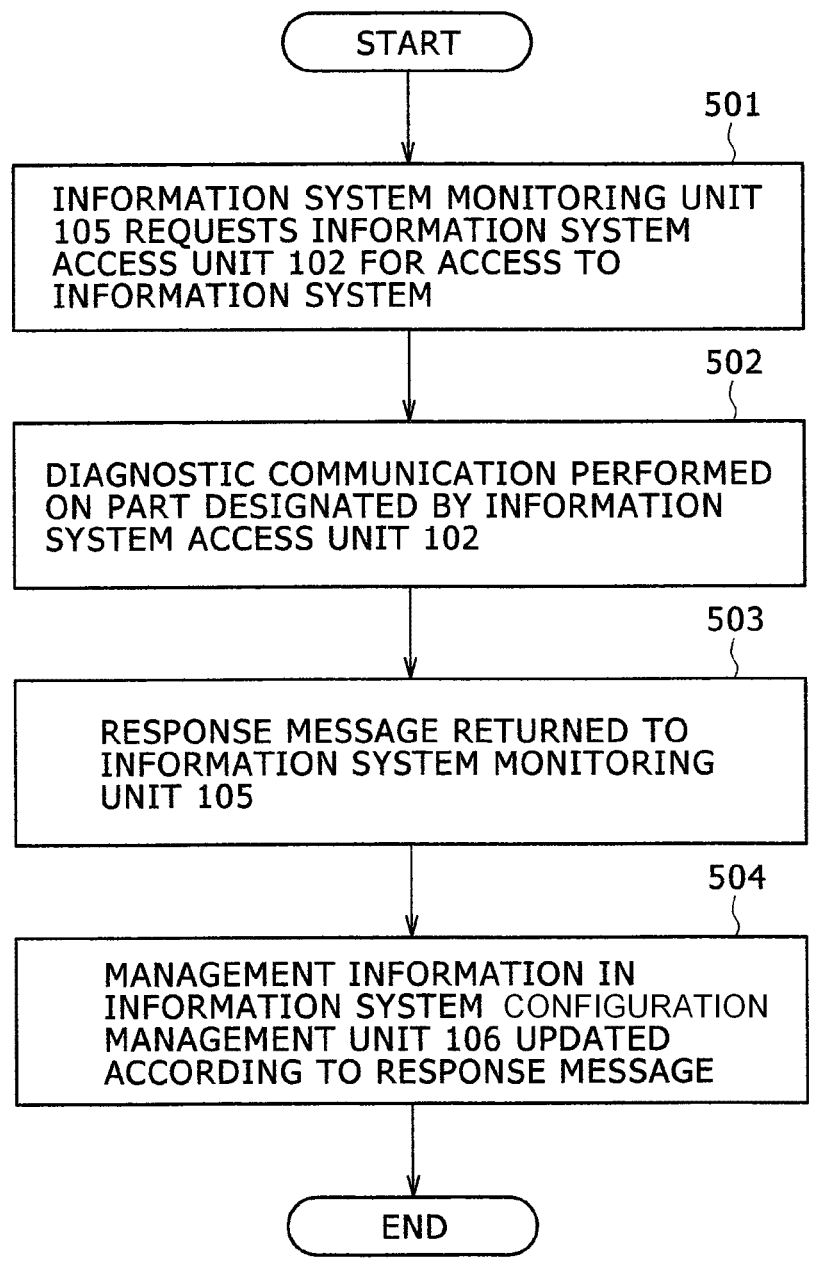
FIG. 5 is a flow chart of processing to update the contents of the information system configuration management unit 106.

Preferred embodiments of the invention in which the information system and the control system of a vehicle are safely connected by an on-vehicle gateway device will be described below with reference to the accompanying drawings.

FIG. 1 shows the configuration of the gateway device in a preferred embodiment of the invention and an on-vehicle system including the same.

A gateway device 101, which is an item to be connected between an information system LAN 112 and a control system LAN 116, intervenes in the co-working between hardware items 113 and 114 connected to the information system LAN 112 and a hardware item 117 connected to the control system LAN 116. Typical examples of on-vehicle information system terminal to be connected to the information system LAN 112 include a car navigation terminal 113 and a camera control terminal 114 for processing and controlling images picked up an on-vehicle camera 115. As the information system LAN 112, a multimedia control area network (CAN), an IEEE 1394, a USB or the like is used.

On the other hand, as an on-vehicle control system terminal to be connected to the control system LAN 116, an electronic control unit 117 is available. As the control system LAN 116, a CAN of Flex Ray is used.

The gateway device 101 has a configuration including an information system access unit 102 taking charge of message transmission and reception to and from the information system LAN 112, a control system access unit 104 taking charge of message transmission and reception to and from the control system LAN 116, an access control unit 103 controlling data flows between the information system access unit 102 and the control system access unit 104, a policy management unit 109 managing policies for access control, an information system monitoring unit 105 monitoring the status of the information system by using the information system access unit 102, an information system configuration management unit 106 storing and managing information acquired by the information system monitoring unit 105, a control system monitoring unit 107 monitoring the status of the control system by using the control system access unit 102, a control system configuration management unit 108 storing and managing information acquired by the control system monitoring unit 105, and a policy update unit 110 determining whether to update a policy and, if it is to be updated, updating the policy by using an external communication unit 111.

A data communication chip or a card using the mobile telephone network or a wireless LAN is supposed for use as the external communication unit 111 here. The access control unit 103 passes judgment regarding access control on the basis of information on the vehicle status managed by the information system configuration management unit 106 and the control system configuration management unit 108. The policy update unit 110 judges whether or not policy updating is needed on the basis of information managed by the information system configuration management unit 106 and the control system configuration management unit 108. These functions are realized by the execution of a prescribed program by a computer.

Figure 12:
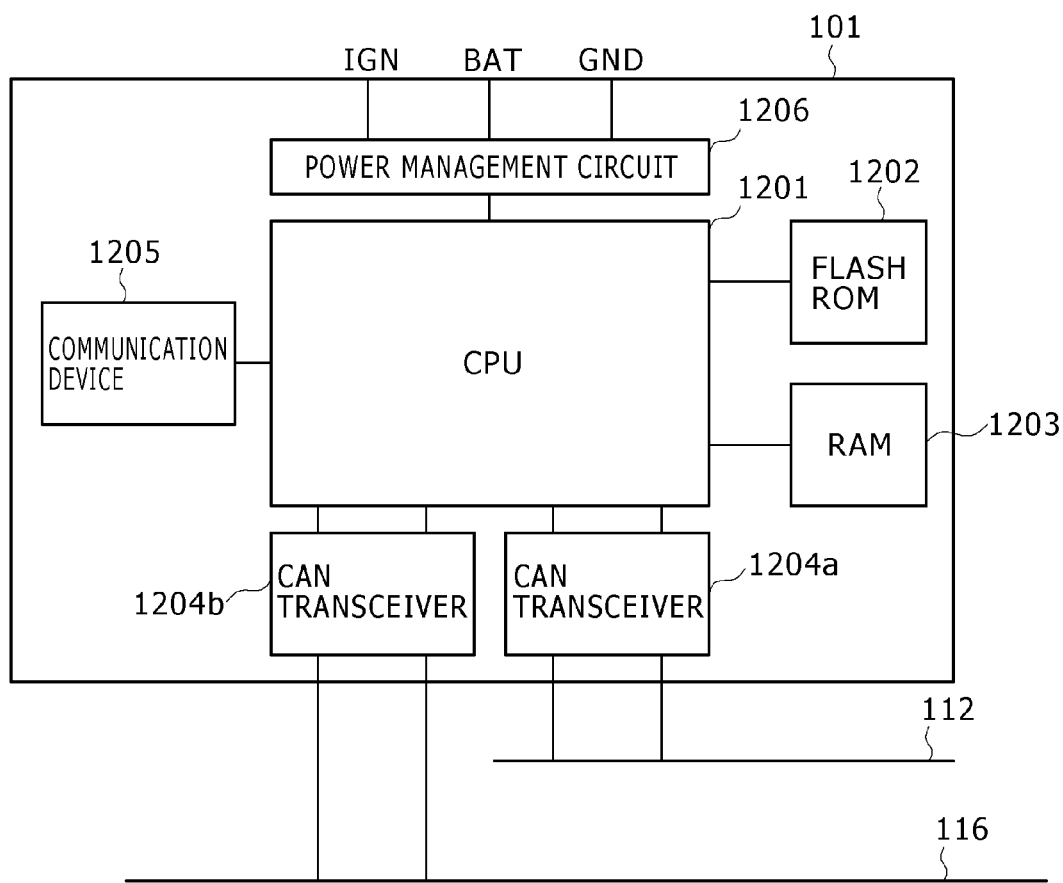
FIG. 12 shows an example of hardware configuration of an on-vehicle gateway device.

FIG. 12 shows a preferable hardware configuration of the gateway device 101.

The gateway device 101 has a configuration including a CPU 1201 for executing prescribed programs, an external flash ROM 1202, a RAM 1203, a CAN controller 1204a for connection to the CAN as the information system LAN 112, a CAN controller 1204b for connection to the control system LAN 116, a communication device 1205 and a power management circuit 1206 for supplying and stopping power by turning on and off ignition in performing radio communication with the outside.

The programs for realization of these functions are stored in a ROM built into the CPU 1201 or the external flash ROM 1202. When the gateway device is to be actuated, they read out of the pertinent ROM and executed by the CPU 1201.

FIG. 2 shows the configuration of a total system for co-working of the gateway device and a center server.

The gateway device 101 is connected to a center server 203 via a public communication network 202. The center server 203 has a storage unit 205 storing policies prescribing accesses to the information system and the control system and a policy update response unit 204 for updating policies governing the gateway device 101.

When an inquiry is placed with the center server 203 regarding any policy update from the gateway device 101 mounted on a vehicle 201 via the external communication unit 111 and the public communication network 202, in the center server 203 the policy update response unit 204 accepts that access, selects an appropriate one out of the policies stored in the policy storage unit 205 and responds to the gateway device 101.

FIG. 3 shows the table structure of the information system configuration management unit 106.

The information system configuration management unit 106 manages information regarding constituent parts connected to the information system LAN 112 and the information system LAN 112 in a list form. The table stores and manages constituent elements including a part name 301, a hardware identifier 302, a software identifier 303, a status 304 and a time stamp 305. The hardware identifier 302 is an ID for uniquely identifying each part as a hardware item, and the software identifier 303 is an identifier representing the software incorporated into the hardware item. The status 304 represents what trouble, if any, arising in the part, and stores a diagnostic trouble code if there is a trouble. The time stamp 305 holds the latest time stamp when information in the status 304 column has been updated.

FIG. 4 shows the table structure of the control system configuration management unit 108.

The control system configuration management unit 108, having a similar configuration to the information system configuration management unit 106, manages the control system LAN 116 and an ECU 117 connected to the control system LAN 116. The table of the control system configuration management unit 108, like the table of the information system configuration management unit 106 holds and manages a part name 401, a hardware identifier 402, a software identifier 403, a status 404 and a time stamp 405.

Next, processing to update the information system configuration management unit 106 will be described with reference to FIG. 5. First, the information system monitoring unit 105 requests the information system access unit 102 for an inquiry access to the information system (step 501). The information system access unit 102 performs diagnostic communication regarding the designated part, and executes communication for data acquisition by inquiry (step 502). Diagnostics On CAN (DiagOnCAN) is standardized as diagnostic communication using a CAN, and is generally used. When inquiry communication is to be performed by using DiagOnCAN, an inquiry with the pertinent ECU 117 is made by using, for instance, ReadDataByLocalID service (service ID: $21) and a designated local ID (e.g. $11 where a hardware/software identifier is to be acquired, or $12 where a diagnostic trouble code is to be acquired).

Next, a response message to this inquiry is returned to the information system monitoring unit 105 (step 503), and management information in the information system configuration management unit 106 is updated in accordance with the response message (step 504). A CAN has a function to detect an error when a message is broken by noise or the like; if an error arises in a message issued by the car navigation terminal 113, the information system access unit 102 detects the error and reception of the notice on the detected error by the information system monitoring unit 105 enables the information system monitoring unit 105 to update the status 304. Then, the hardware/software identifier acquired by the inquiry communication using DiagOnCAN causes entries in the columns of the hardware identifier 302 and the software identifier 303 in the information system configuration management unit 106 to be updated. If there is any change in the entry in the "This time" column, the entry in the "This time" is copied into the "Last time" column, and the "This time" column is updated to a new datum. When a diagnostic trouble code has been acquired, the status 304 column is updated to the latest diagnostic trouble code, and the day and hour of updating this entry are recorded in the time stamp 305 column.

FIG. 6 is a flow chart of processing to update the contents of the control system configuration management unit 108.

This update processing is essentially similar to the update processing by the information system configuration management unit 106 described above.

First, the control system monitoring unit 107 requests the control system access unit 104 for an access to the control system (step 601), and the control system access unit 104 performs diagnostic communication, such as DiagOnCAN, regarding the designated part (step 602). A response message by diagnostic communication is returned to the control system monitoring unit 107 (step 603), and management information in the control system configuration management unit 108 is updated in accordance with the response message (step 604). If, for instance, a response message to an inquiry from the control system monitoring unit 107 to the ECU or a message periodically transmitted from the ECU includes information on battery voltage, this information is extracted from the message, and the status 404 of the record regarding the part name 401 "battery" in FIG. 4 is updated by entering a value, such as "voltage 10 V".

Next, the configuration of the policy management unit 109 will be described with reference to FIG. 7.

The policy management unit 109 is intended for managing, when the access control unit 103 is to perform access control, the access control policy on which the access control is based, and includes three tables of (a) access control rules, (b) access permit conditions and (c) access conversion rules.

(a) The access control rules set forth and list up which service is to be permitted at what timing and what is to be done when access is refused. In this embodiment, the access control rules provide for "CAN ID", "Service ID", "Parameter", "Access permit conditions" and "When inaccessible". "CAN ID", "Service ID" and "Parameter" provide values to be designated when access control is to be performed on diagnostic communication by DiagOnCAN. In "CAN ID", the ECU 117 which is the addressee of inquiry, and in "Service ID", the ID of the DiagOnCAN service to be permitted under the condition (for instance, $21 if it is ReadDataByLocalID) and the parameter to be designated by the service of the service ID (the local ID if the service is ReadDataByLocalID) are prescribed. In "Access permit conditions", the condition for permitting DiagOnCAN communication is designated by the serial number of the pertinent condition in the list of (b) Access permit conditions. Plural conditions may be prescribed as composite conditions by connecting them by "AND" or "OR". In "When inaccessible", how to cope with a failure to meet the access permit conditions is prescribed. For instance, "Refuse access" or "Self-shut-off" can be prescribed.

(b) The table of access permit conditions lists up individual condition for permitting access under (a) Access control rules. In this embodiment of the invention, the access permit conditions are expressed in terms of "Part", "Hardware identifier" "Software identifier" and "Status".

These are the same as the contents of the information managed by the information system configuration management unit 106 and the control system configuration management unit 108. If, for instance, access permit is conditioned on that the hardware identifier, the software identifier and the status of the part "ECU1" and "9876", "002" and "Nothing wrong", respectively, these factors are added to the list. For those not having hardware and/or software identifiers, such as "control system LAN" and "battery", neither hardware nor software identifier needs to be designated.

The configuration described above makes possible appropriate access control by adapting to version updating and status variations of the vehicle expected to change dynamically. For instance, such measures can be taken as "no access to the ECU is attempted if the battery voltage is not above a prescribed level" or "any request from the car navigation device is intercepted if any abnormality in the car navigation device is detected".

(c) Access conversion rules prescribes how the message is to be converted when a message from the information system LAN 112 is to be transferred to the control system LAN 116 or, conversely, a message from the control system LAN 116 is to be transferred to the information system LAN 112.

Regarding this embodiment, a case of converting a message from the information system LAN 112 is converted in CAN ID according to the hardware/software identifier of the addressee ECU 117 and transmitted is shown in FIG. 7C. In FIG. 7, it is prescribed by rule that, when the CAN ID of the message from the information system LAN 112 is "10D", the hardware identifier of part name "ECU1" is "9876" and the software identifier of the same is "005", the CAN ID shall be converted to "21A". "Part name", "Hardware identifier" and "Software identifier" which constitute the conditions of whether to convert the CAN ID are prescribed as items of "Check list". Although conversion of only the CAN ID is referred concerning this embodiment, it may as well be prescribed as a rule on moving the bit positions in the data contained in the message. For instance, "moving the two bits from the 15th to the 16th to the positions of the 31st to the 32nd" may be prescribed as a rule.

The foregoing configuration has the following advantages. For instance, when the car navigation terminal 113 is updated, the new car navigation terminal 113 may transmit to the control system a message of an unprecedented type, developed for the new control system. Even in such a case, a message incompatible with the un-updated existing control system can be intercepted or aspects of the protocol such as the message format can be converted to match the old control system by detecting the incompatibility between the new and old systems, and the control system can be managed to be immune from adverse effects.

Figure 8:
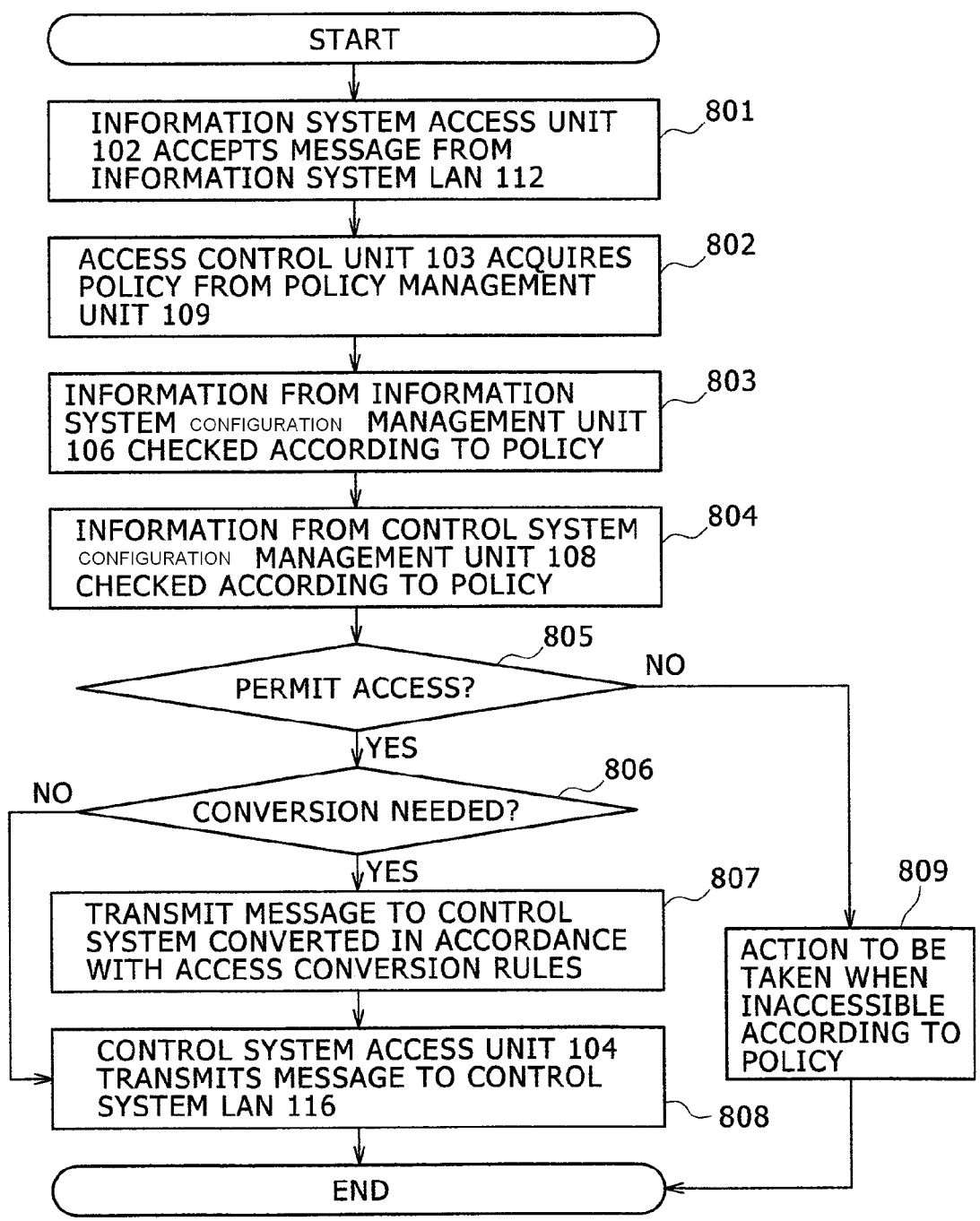
FIG. 8 is a flow chart of processing of access control to be executed when a message from an information system LAN is to be sent to a control system LAN.

Next, processing to perform access control by using a policy prescribed in the policy management unit 109 will be described with reference to FIG. 8.

First, a message from the information system LAN 112 is accepted by the information system access unit 102 (step 801). After that, the access control unit 103 acquires the policy from the policy management unit 109 (step 802). Then, it is checked on the basis of the access permit conditions of FIG. 7B whether or not information meeting "Access permit conditions" prescribed in the access control rules of FIG. 7A from the information system configuration management unit 106 matches the values of "Part", "Hardware identifier", "Software identifier" and "Status" stated in the access permit conditions of FIG. 7B (step 803). Similarly, it is checked on the basis of the access permit conditions of FIG. 7B whether or not information from the control system configuration management unit 108 matches the values of "Part", "Hardware identifier", "Software identifier" and "Status" stated in the access permit conditions of FIG. 7B (step 804).

Next, the determination of whether or not to permit access checked at step 803 or 804 is confirmed (step 805). If the result is to permit access, it is determined whether or not conversion is needed by comparing the "CAN ID" prescribed by the access conversion rules of FIG. 7C with the CAN ID of the transmission message and "Part name", "Hardware identifier" and "Software identifier" prescribed in the "Check list" prescribed by the access conversion rules of FIG. 7C with the corresponding contents of the information system configuration management unit 106 or the control system configuration management unit 108 (step 806). If conversion is found necessary as a result, the transmission message to the control system is converted in accordance with the access conversion rules (policy) (step 807). Then, the control system access unit 104 transmits a message to the control system LAN 116 (step 808) to end the processing.

On the other hand, if conversion is found unnecessary as a result of the determination at step 806, the processing advances to step 808, and a message is transmitted to the control system LAN 116. Or if access is impermissible as a result of the determination at step 805, the content of the pertinent rule is implemented in accordance with "When inaccessible" under the access control rules of FIG. 7A.

The processing described above can suppress the possibility of inflicting adverse effects on the control system even if, for instance, access is attempted from the latest car navigation terminal 113 by a new method not supported by the old ECU 117, by intercepting the attempted access or converting to an access method supported by the old ECU 117.

Figure 9:
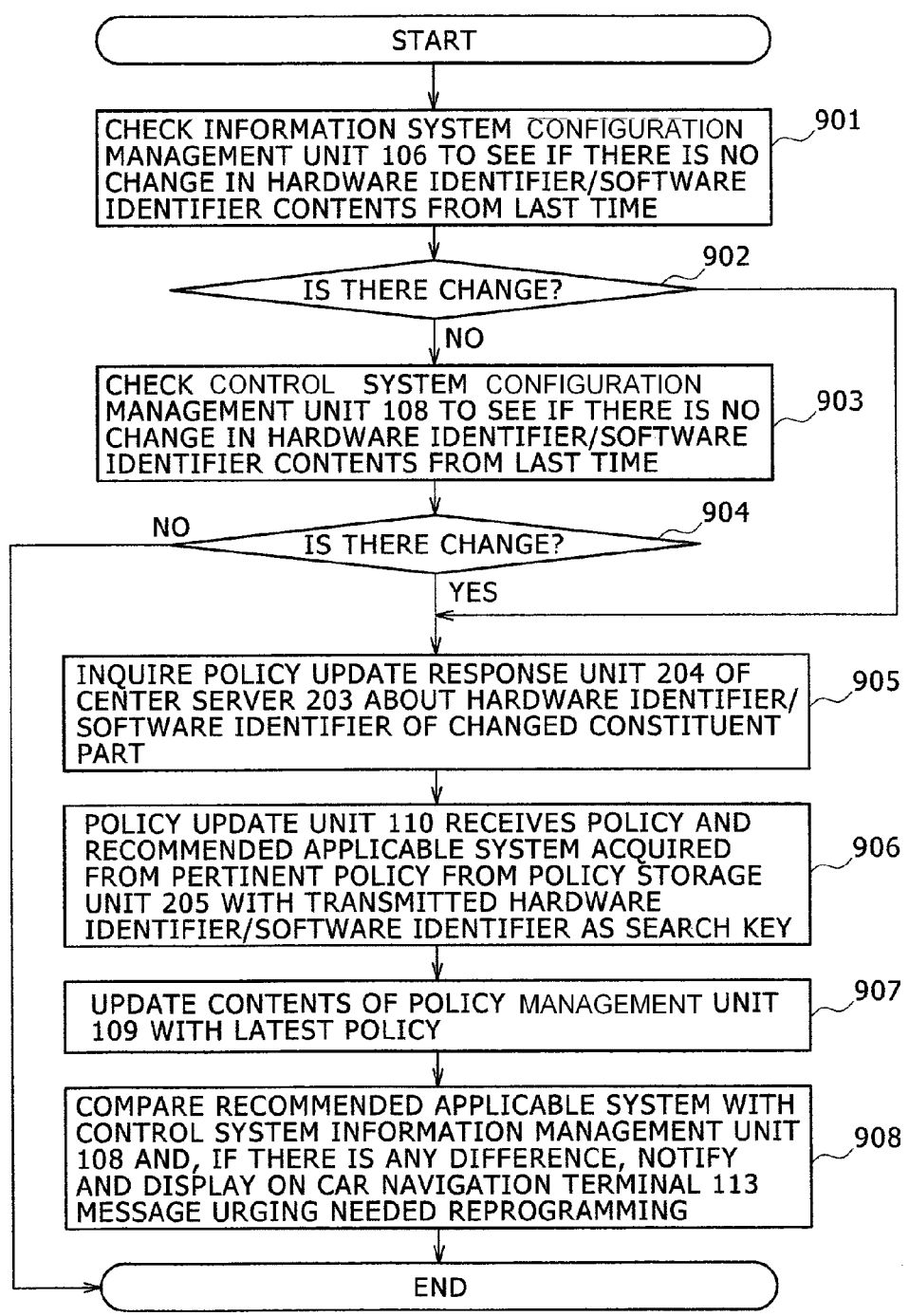
FIG. 9 is a flow chart of processing to update the policy by accessing the center server.

Next, processing to update a policy managed by the policy management unit 109 in response to a change in the configuration of the information system of the control system will be described with reference to FIG. 9.

First, the policy update unit 110 checks the information system configuration management unit 106 to see if there is no change in the contents of the hardware identifier and/or the software identifier between this time and last time (step 901). If the result of judging whether or not there is any change (step 902) indicates a change, the policy update response unit 204 of the center server 203 is asked about the hardware identifier and/or the software identifier of the changed constituent part (step 905).

Or if there is no change, the control system configuration management unit 108 is checked to see if there is no change in the contents of the hardware identifier and/or the software identifier between this time and last time (step 903). If the result of judging whether or not there is any change (step 904) indicates a change, the processing advances to step 905. If there is no change, it is determined that no policy updating is required and the processing is ended.

Inquiry with the center server 203 at step 905 results in acquisition of the pertinent policy from the policy storage unit 205 with the transmitted hardware identifier and/or the software identifier being used as the search key, and this policy is received by the policy update unit 110 (step 906).

Figure 10:
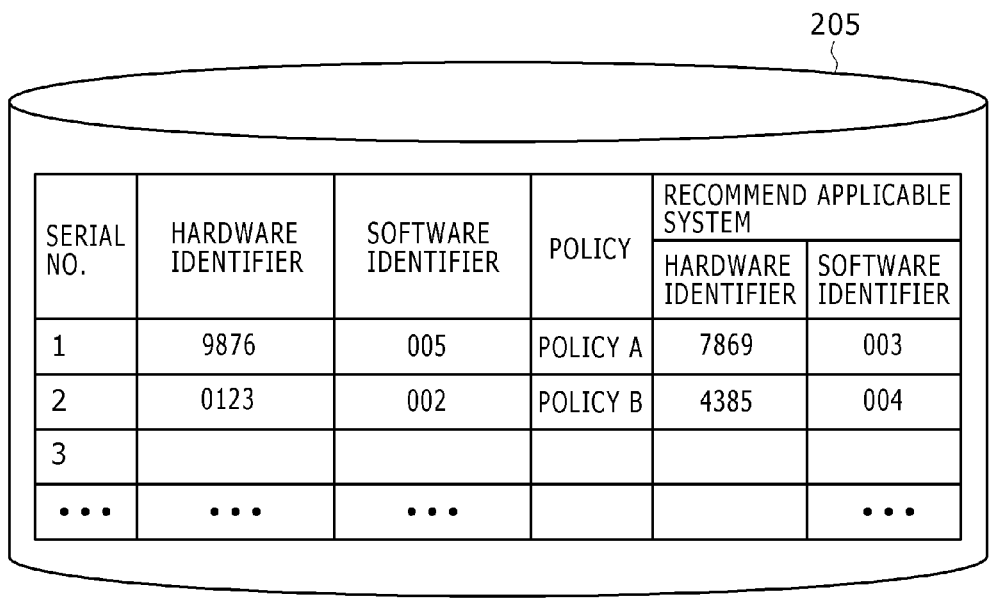
FIG. 10 shows the table structure of a policy storage unit in the center server.

The table structure of the policy storage unit 205 is shown in FIG. 10. The policy storage unit 205 manages a hardware identifier, a software identifier, a policy and a recommended applicable system in combination. Whereas the contents of the policy here are (a) Access control rules, (b) Access permit conditions and (c) Access conversion rules tabulated in FIG. 7, the management method may as well be an excerpt only of the parts relevant to the designated hardware identifier and/or the software identifier. The recommended applicable system has a system configuration recommended for receiving the latest service matching the updating of parts, and more specifically the hardware identifier and/or the software identifier of the co-working partner (if co-working is with the control system, the ECU 117).

After that, the policy update unit 110 updates the contents of the policy management unit 109 with the latest policies (step 907) and, comparing the recommended applicable system and the control system configuration management unit 108, if there is a difference, sends a ⅓ message urging necessary system updating (if the ECU 117 is to be updated, reprogramming) to the car navigation terminal 113 to have it displayed (step 908).

Figure 11:
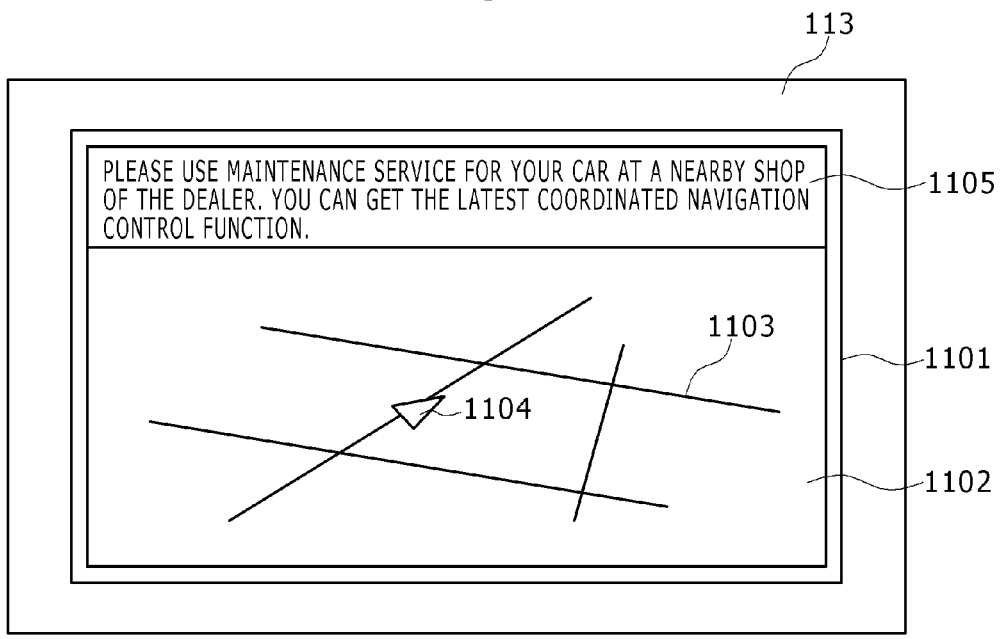
FIG. 11 shows an example of screen for displaying a vehicle system update guidance on a car navigation terminal.

Here, an example of screen in which a message is played on the car navigation terminal 113 is shown in FIG. 11. On the car navigation display unit 1101 of the car navigation terminal 113, a road symbol 1103, the vehicle's current position symbol and so forth are displayed on a map display unit 1102. In addition to them, a message urging system updating, such as "Please use maintenance service for you car at a nearby shop of the dealer. You can get the latest coordinated navigation control function", is displayed on a guidance display unit 1105.

As described above, this embodiment of the invention, even when the hardware and the software of the information system and the control system of the vehicle are replaced and updated, enables the policies to adapt to the changes in the vehicle and continue appropriate management of the co-working between the information system and the control system.

Now will be described second and third preferred embodiments of the invention.

Figure 13:
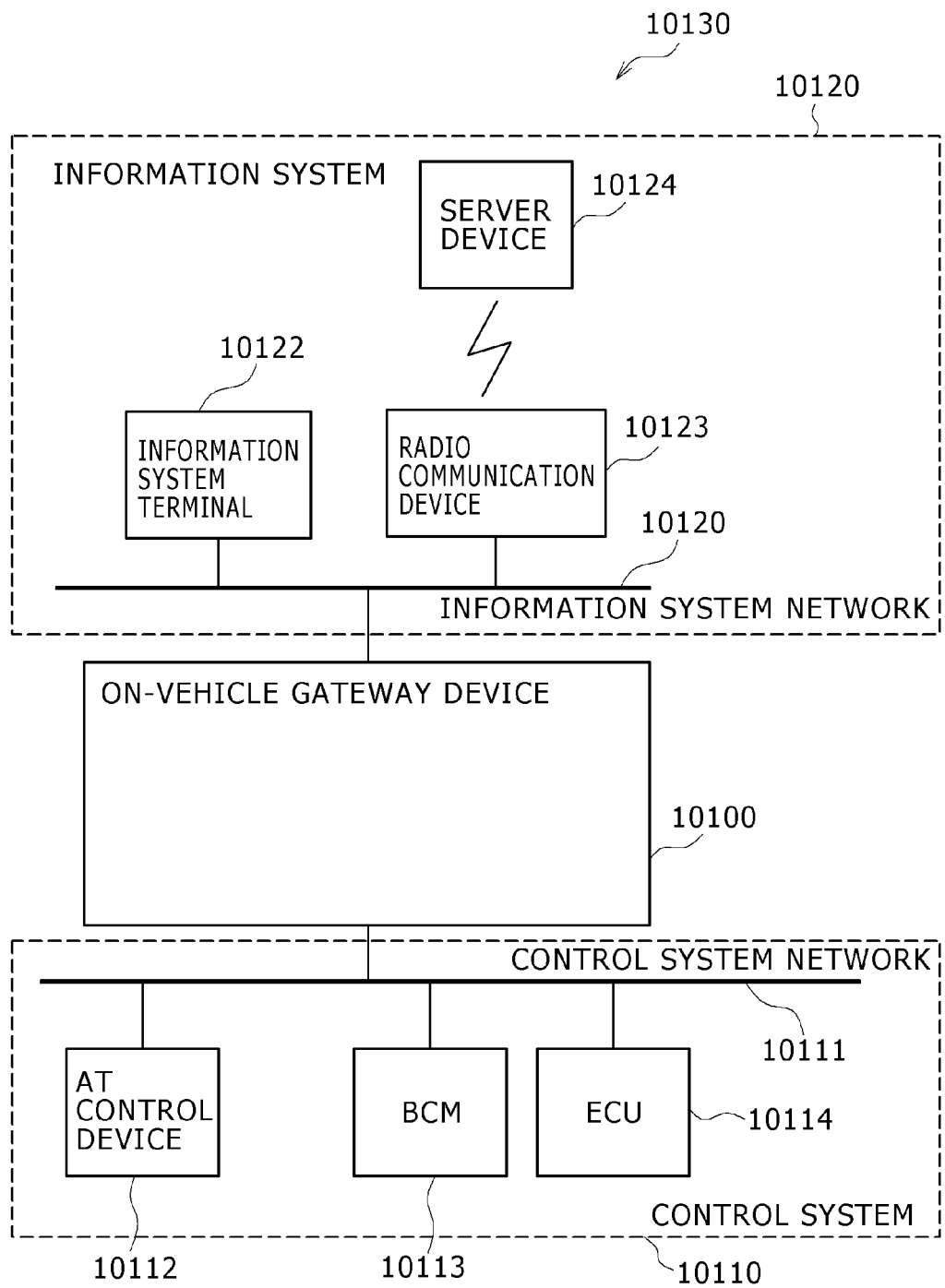
FIG. 13 shows the total configuration of a system in which an information system and a control system are connected via the on-vehicle gateway device.

FIG. 13 schematically shows an on-vehicle network 10130.

As illustrated, an on-vehicle network 10130 is provided with a control system network 10111, an information system network 10121 an on-vehicle gateway device 10100.

In this application, the control system network 10111 means a network to which an engine controller is connected or a network over which vehicle speed signals flow. Generally, the updating period of information flowing over the network is from 1 millisecond to 400 milliseconds approximately.

The information system network 10121 means a network to which a navigation device is connected of a network over which map data information flows. Generally, the updating period of information flowing over the network is 400 milliseconds or above.

As illustrated, electronic control units including an automatic transmission (AT) control device 10112 for controlling the transmission of the vehicle, a body control module (BCM) 10113 for controlling the body system including door locks and an engine control unit (ECU) 10114 for controlling the rotational frequency and other factors of the engine together with the on-vehicle gateway device 10100, for instance, are connected to the control system network 10111, and these devices constitute the control system 10110.

The devices connected via the control system network 10111 can exchange control data among one another. For instance the AT control device 10112, when it receives control data on turning right or left from the on-vehicle gateway device 10100, shifts the transmission according to the control data. Similarly the BCM 10113, when it receives control data on door unlocking from the on-vehicle gateway device 10100, unlocks a door or doors.

The control system network 10111 is, for instance, a controller area network (CAN), a local interconnect network (LIN) or a network conforming to Flex Ray or like standards.

Figure 14:
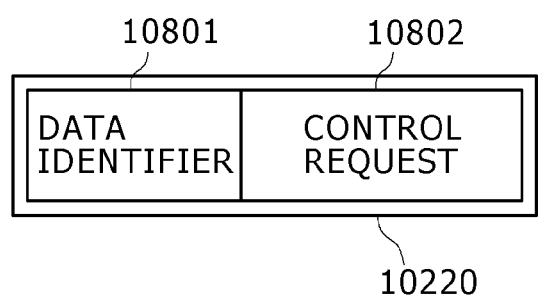
FIG. 14 shows the message format of control system data in a second preferred embodiment of the invention.

Control system data 10220 flowing over the control system network 10111 have the data format shown in FIG. 14. The control system data 10220 includes, for instance, a data identifier 10801 representing the type of the control system data 10220 and a control request 10802 representing what is to be controlled with the control system data 10220.

Referring back to FIG. 13, an information system terminal 10122 and a radio communication device 10123, for instance, are connected to the information system network 10121, and these devices constitute an information system 10120.

The information system terminal 10122 is, for instance, a car navigation device, and the car navigation device can transmit route guidance information, such as "Turn right" or "Turn left", to the control system 10110 via the on-vehicle gateway device 10100.

Further, when the radio communication device 10123 connects to a server device 10124, the car navigation device is enabled to receive required map data and the like from the server device 10124 via the radio communication device 10123 by utilizing a public wireless communication network, such as a mobile telephone network. It is also possible to mount the server device 10124 with a vehicle diagnosis program in advance and request the control system 10110 from this program necessary information for diagnosis. In this case, since the request from the server device 10124 need not go via the information system terminal 10122, it may as well be directly transmitted to the on-vehicle gateway device 10100.

The information system network 10121 is a network conforming to the standards of CAN, IEEE 1394, Media-Oriented Systems Transport (MOST) or the like, for instance. The radio communication device 10123 may as well be connected to the information system terminal 10122. In this case, since the information system network 10121 need not constitute a network, serial connection utilizing the Universal Serial Bus (USB) may as well be used.

Figure 15:
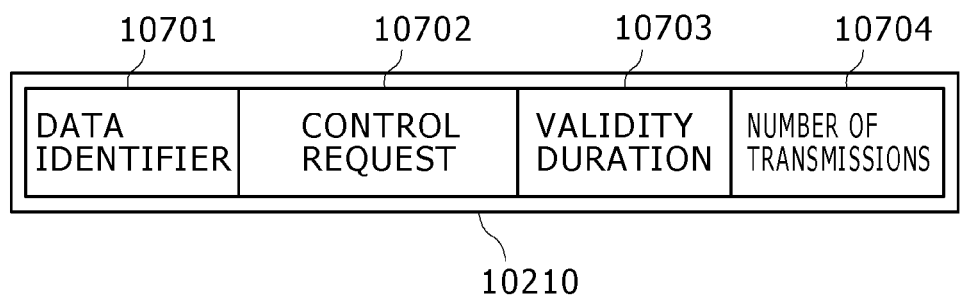
FIG. 15 shows the message format of information system data in the second embodiment of the invention.

Information system data 10210 flowing over the information system network 10121 have the data format shown in FIG. 15.

For instance, the information system data 10210 include a data identifier 10701 indicating the type of the data, a control request 10702 representing what is to be controlled with the information system data 10210, a validity duration 10703 indicating how long the information system data 10210 will remain valid and the number of transmissions 10704 designating the number of times the on-vehicle gateway device 10100 is to transmit the information system data 10210 to the control system 10110.

In the foregoing information system data 10210, the data identifier 10701 indicates the type of the data. The electronic control units in the control system 10110 to be described afterwards may determine the contents of the transmitted data on the basis of this data identifier 10701.

The control request 10702, representing what is to be controlled by the control system 10110 at the request of the information system 10120, is specific, such as "Turn left 1 km ahead" or "Unlock doors".

The validity duration 10703 indicates how long the will be held by the on-vehicle gateway device 10100. For instance, a length of time matching the data updating time designated by software on the information system terminal 10122 which the control request 10702 causes to generate is designated. Thus, it is usual for information on the traveling route which is updated at one-second intervals to remain effective for one second until the information is updated next time.

For instance, the validity duration of data is the updating interval of the data set by software operating on the information system terminal 10122 or elsewhere. When a control request involving a position, such as "Turn left 1 km ahead", is issued from the car navigation device for instance, usually that information should remain valid only for a limited length of time. The validity duration is set by software on the car navigation device: for example, where positional information is updated at one-second intervals, 1000 milliseconds is set as the validity duration of the pertinent control request.

The number of transmissions 10704, which means how many times the control request 10702 is transmitted within the validity duration 10703, is designated in advance by software operating on the information system terminal 10122 on the basis of the importance of the control request 10702, the network load factor of the control system network 10111 and other considerations.

Figure 16:
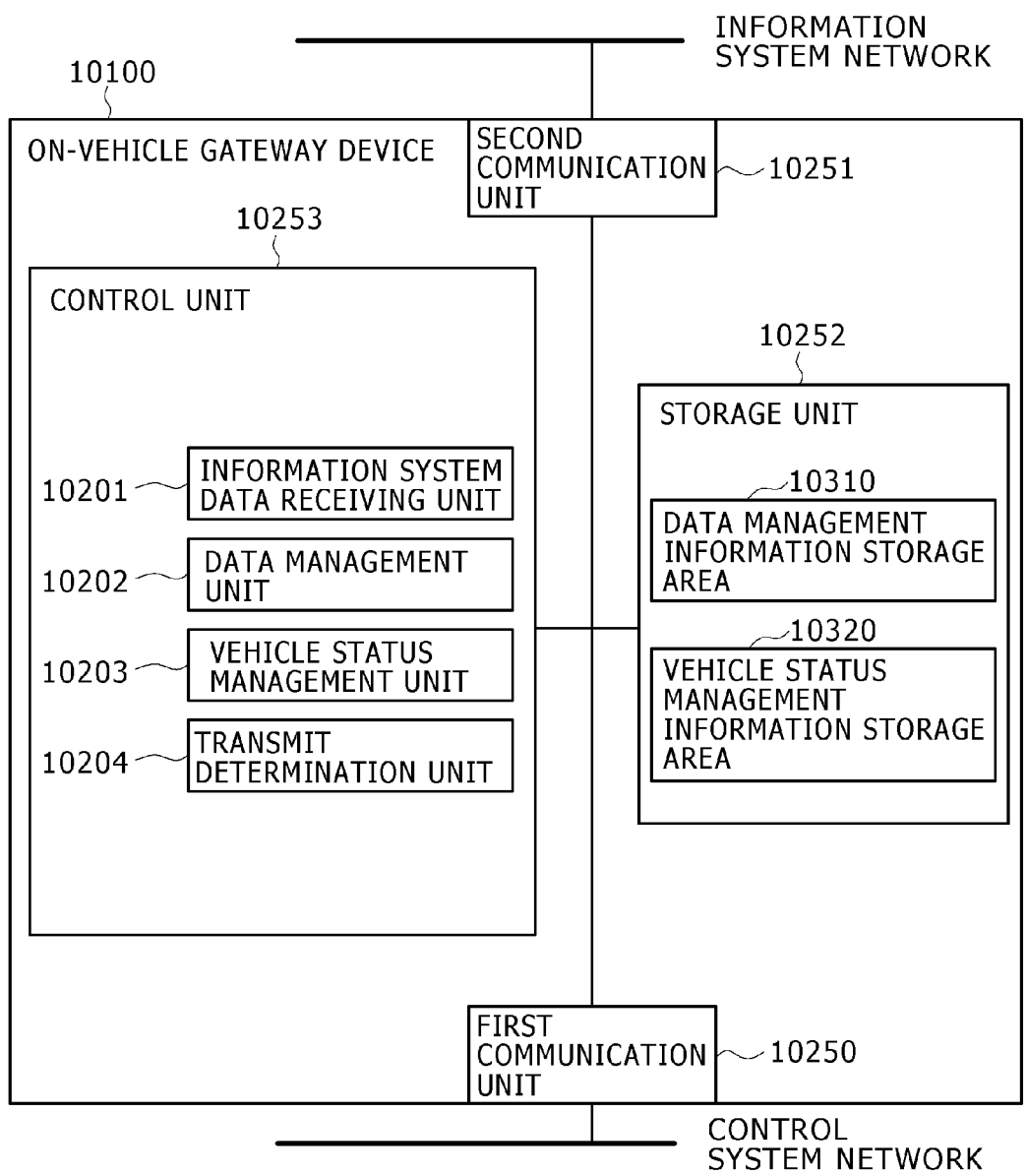
FIG. 16 shows the hardware configuration of an on-vehicle gateway device in the second embodiment of the invention.

FIG. 16 schematically illustrates the on-vehicle gateway device 10100.

The on-vehicle gateway device 10100 has a first communication unit 10250, a second communication unit 10251, a storage unit 10252 and a control unit 10253.

The first communication unit 10250 is a unit which establishes connection to the control system network 10111 and realizes the function to perform communication control.

The second communication unit 10251 is a unit which establishes connection to the information system network 10121 and realizes the function to perform communication control.

The storage unit 10252 is provided with a data management information storage area 10310 and a vehicle status management information storage area 10320.

In the data management information storage area 10310, data transmitted from the information system network 10121 to the control system network 10111 via the on-vehicle gateway device 10100 and information for management of the data are stored.

For instance, the data identifier 10701 of the information system data 10210 and the control request 10702 are stored in the data management information storage area 10310 as data to be transmitted from the information system network 10121 to the control system network 10111.

And, for instance, a data management table 10311 shown in FIG. 17 is stored in the data management information storage area 10310 information for management of data from the information system network 10121 to the control system network 10111.

As illustrated, the data management table 10311 is provided with a priority level field 10312, a timer count field 10313, a number of transmissions field 10314, an identifier field 10315 and a data pointer field 10316, and holds one record per item of data transmitted from the information system network 10121.

In the priority level field 10312, information specifying the level of priority in transmitting the data managed in the records is stored. The level of priority, as will be described afterwards, rises in the ascending order of the quotient of the number of transmissions divided by the timer count. For those equal in the quotient of the number of transmissions divided by the timer count, for instance, what is entered into the data management table 10311 earlier is higher in the level of priority.

In the timer count field 10313, information that specifies the time limit of data held in each record is stored. The initial value of the timer count field 10313 is the validity duration 10703 contained in the information system data 10210, and for each updating period of the data management table 10311 the balance of subtracting the length of the pertinent period from the validity duration 10703 is stored.

In the number of transmissions field 10314, information that specifies the number of times data managed in each record are to be transmitted to the control system network 10111 is stored. The initial value of the number of transmissions field 10314 is the number of transmissions 10704 of the information system data 10210, and the number of transmissions is decremented by "1" from the number of transmissions 10704 every time the pertinent record is transmitted to the control system network 10111.

In the identifier field 10315, identifying information (ID) for identifying data managed in each record is stored. The initial value of the identifier field 10315 is the data identifier 10701 contained in the information system data 10210.

In the data pointer field 10316, information that specifies the storage position (address) of data managed in each record is stored.

In the case shown in FIG. 17, a record that holds information of 100 milliseconds in validity duration, one in the number of transmissions and a control request identified by #10 is stored in an address H 'FFFF4000 is stated as the data of the highest priority. This indicates a record that requires transmission of a control request identified by #10 at least once in 100 milliseconds.

Referring back to FIG. 16, information for managing the communication state of the control system network 10111 is stored in the vehicle status management information storage area 10320.

For instance, a vehicle status management table 10321 shown in FIG. 18 is stored in the vehicle status management information storage area 10320.

As illustrated, the vehicle status management table 10321 is provided with an item field 10322 and a status field 10323.

In the item field 10322, information specifying the state of communication over the control system network 10111 managed in each record is stored. Although records of the network load factor and voltage are stored here in this embodiment, this not the only available mode of implementing the invention.

In the status field 10323, the network load factor or the voltage is stored in each record.

As the plural devices connected to the control system network 10111 here transmit control data usually at regular intervals, the control system network 10111 presumably communicate a substantially constant number of sets of control data at specific intervals of time in the normal status. When the number of sets of data at specific intervals of time is greater than in the normal status, more sets of control data are needed for controlling the vehicle, and in such a status, transmission of data from the information system 10120 to the control system network 10111 is highly likely to adversely affect the control of the vehicle.

Therefore in this embodiment of the invention, the number of sets of data flowing over the control system network 10111 at specific intervals of time in the normal status is predetermined, and the number of sets of such data and the number of sets of data actually flowing over the control system network is figured out as the network load factor and stored into the vehicle status management table 10321.

Further, the voltages applied to electronic control units or the output voltage from the battery system of the vehicle is also regarded as representing the vehicle status. Generally, when voltages applied to devices connected to the control system network 10111 become unstable, noise becomes more likely to find its way onto the control system network 10111. Thus, if the on-vehicle gateway device 10100 transmits data transmitted from the information system network 10121 to the control system network 10111 when the voltage is unstable, it may invite the occurrence of a large number of erroneous frames in the control system network 10111. Therefore in this embodiment, the voltages applied to devices connected to the control system network or the output voltage from the battery system of the vehicle is acquired, and the result is stored into a vehicle status management table 10320.

FIG. 18 shows a status in which the network load factor is 54% and the voltage of the electronic control units is 11.8 V, for instance.

The control unit 10253 is provided with an information system data receiving unit 10201, a data management unit 10202, a vehicle status management unit 10203 and a transmission determination unit 10204.

The information system data receiving unit 10201 receives information system data from the information system network 10121 via the second communication unit 10251, and hands them over to the data management unit 10202.

The data management unit 10202 registers the data into the data management table 10311 as a record on the basis of the information system data 10210 including control information for the control system network 10111, delivered from the information system data receiving unit 10201. Further, the data management unit 10202 periodically discards or updates data in accordance with the number of transmissions 10314 and the validity duration 10315 of the registered records.

The vehicle status management unit 10203, when it receives via the first communication unit 10250 the control system data 10220 flowing over the control system network 10111, figures out information indicating the vehicle status of the received control system data 10220, and writes the information into the vehicle status management table 10321.

The transmission determination unit 10204 periodically reads in the vehicle status management table 10321, checks whether or not each item is within the prescribed threshold and, if it is, determines that records registered in the data management table 10311 can be transmitted to the control system network 10111. If it is not, transmission in that period is refrained from.

If the transmission determination unit 10204 determines that transmission is possible, it takes out the record of the highest priority level among the records registered in the data management table 10311, acquires the identifier field 10315 of the record and data at the memory address indicated by the data pointer field 10316, shapes them in accordance with the format shown in FIG. 14, assembles the control system data 10220, and transmits them to the control system network 10111 via a first communication interface 10101. After the transmission, the number of transmissions field 10314 registered in the data management table 10311 is updated by subtraction with respect to the transmitted record.

The data management unit 10202, the vehicle status management unit 10203 and the transmission determination unit 10204 perform processing reiteratively each in an independent period.

Figure 19:
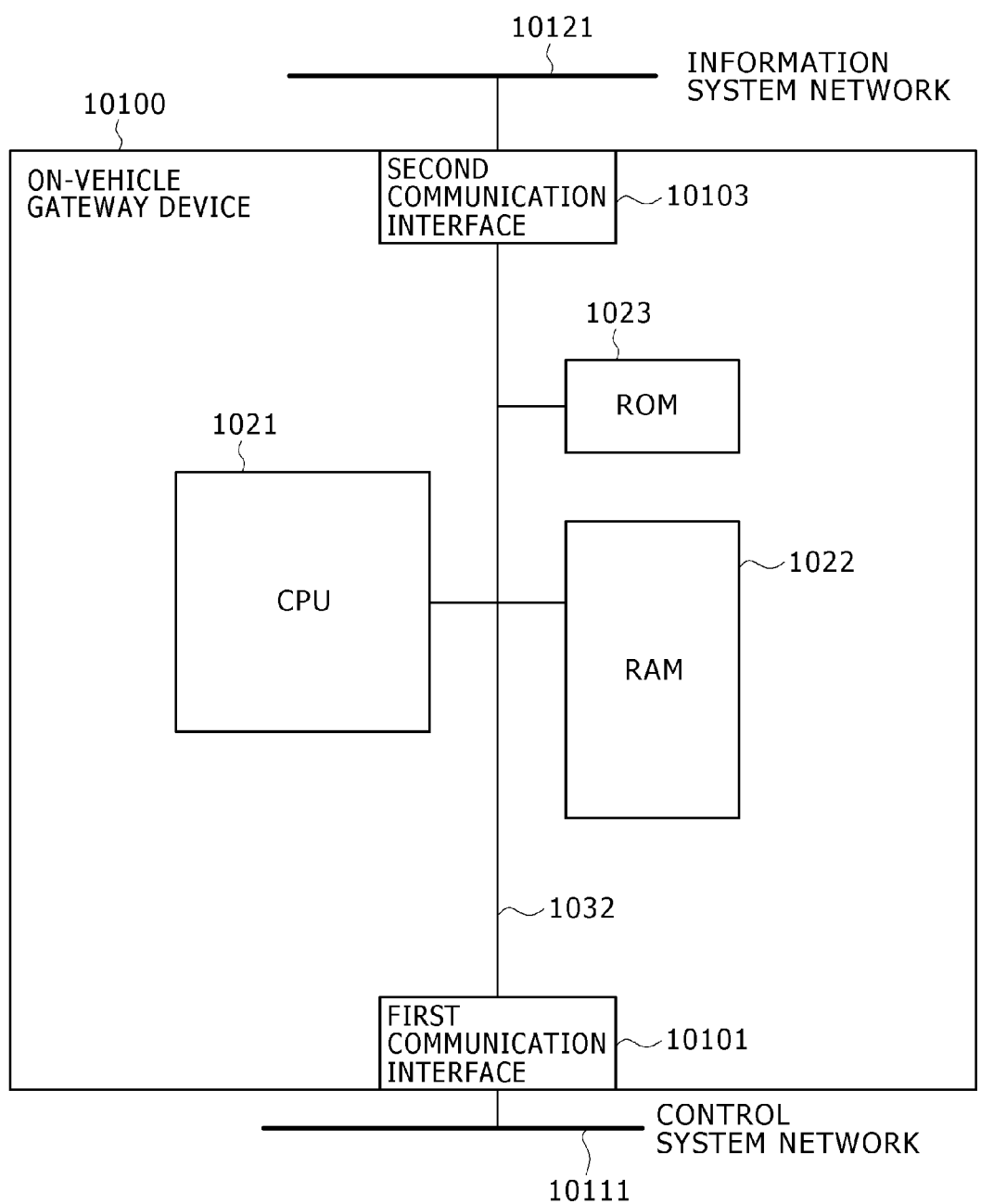
FIG. 19 shows the hardware configuration of a gateway device in the second embodiment of the invention.

The on-vehicle gateway device 10100, as shown in FIG. 19, can be configured of a so-called computer having a central processing unit (CPU) 1021 which is an arithmetic device, a random access memory (RAM) 1022 which is the main storage device, a read only memory (ROM) 1023 for storing programs and data, a bus 1032 which links these items, the first communication interface 10101 which is an interface capable of transmitting and receiving information via the control system network 10111 and a second communication interface 10103 which is an interface capable of transmitting and receiving information via the information system network 10121.

The information system data receiving unit 10201, the data management unit 10202, the vehicle status management unit 10203 and the transmission determination unit 10204 referred to above can be realized by the processing their arithmetic operations by the CPU 1021 by executing instruction codes developed in the RAM 1022. The instruction codes developed in the RAM 1022 may be stored in advance in the ROM 1023, or acquired from a device connected to the information system network 10121 via the second communication interface 10103.

The RAM 1022 has not only the area in which instruction codes are developed but also an area in which the data management table 10311 and the vehicle status management table 10321 are recorded.

The ROM 1023, which is a usual ROM device for use on a vehicle, stores in advance software for the gateway device, initial values of data required by the software and other data which need no rewriting.

The first communication unit 10250 can be realized with the first communication interface 10101, and the second communication unit 10251, with the second communication interface 10103.

The operation of these hardware devices and functional units enables the on-vehicle gateway device 10100 to received data from the information system 10120, and a function to transmit the data to the control system 10110 to wait for retransmission if the status of the control system 10110 is stable, or, if the status is not stable, to stand by for transmission can be realized.

Next, the operation of the on-vehicle gateway device 10100 in the second embodiment will be described with reference to FIG. 20 through FIG. 23.

Figure 20:
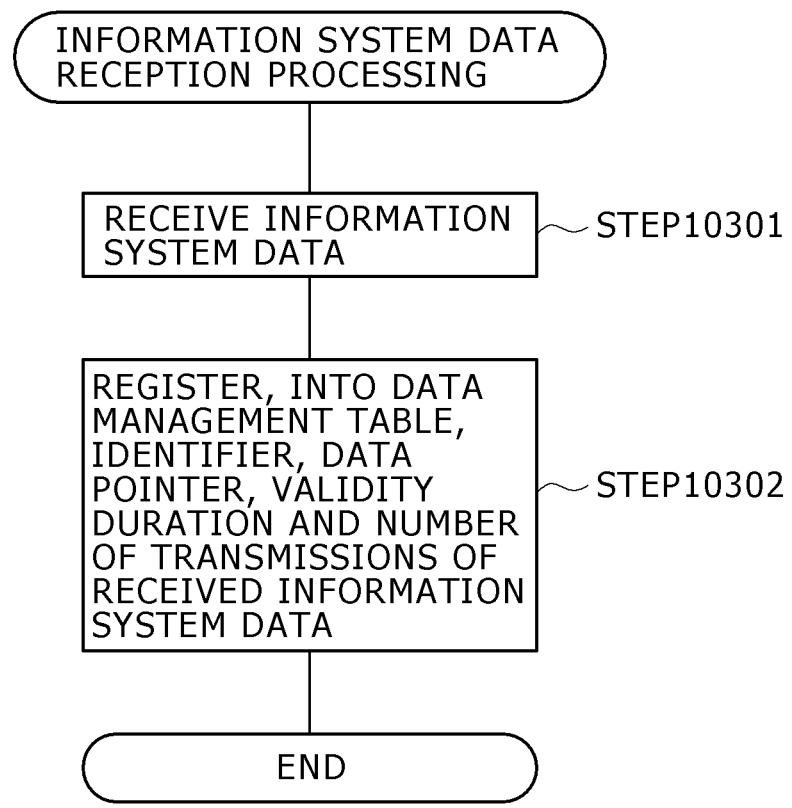
FIG. 20 is a flow chart of processing to receive information system data in the second embodiment of the invention.

Then, FIG. 20 charts a detailed processing flow of the information system data receiving unit 10201 described above.

First, the information system data receiving unit 10201 receives from the second communication interface 10103 the information system data 10210 containing control information for the control system network 10111 (STEP 10301).

Next, the information system data receiving unit 10201 registers into the data management table 10311 the information system data 10210 containing the received control information for the control system network 10111. More specifically, the information system data receiving unit 10201 stores into a buffer area on the RAM 1022 (not shown) the control request 10702 of the information system data 10210 containing the received control information for the control system network 10111, and stores into the data pointer field 10316 of the data management table 10311 on the RAM 1022 a data pointer indicating the address of the buffer area into which the request has been stored. Further, the information system data receiving unit 10201 carries out registration by storing into the identifier field 10315 of the data management table 10311 the data identifier 10701 contained in the information system data 10210 containing control information for the control system network 10111, storing the validity duration 10703 into the timer count field 10313 and storing the number of transmissions 10704 into the number of transmissions field 10314 (STEP 10302).

Figure 21:
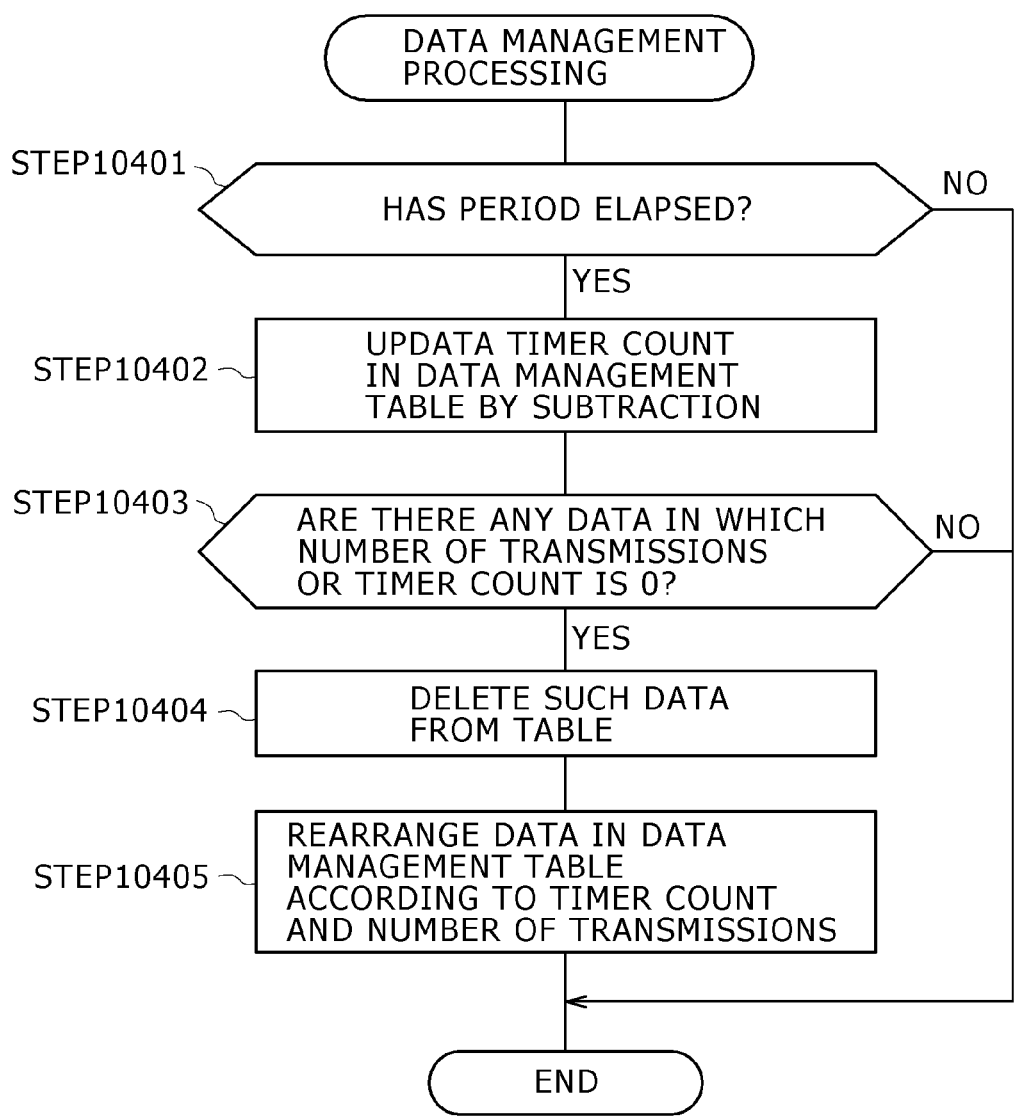
FIG. 21 is a flow chart of data management processing in the second embodiment of the invention.

Then, FIG. 21 charts the flow of processing by the data management unit 10202 which manages records of the data management table 10310 registered by the information system data receiving unit 10201.

First, the data management unit 10202 determines according to timer information from a prescribed timer device whether or not to start its own processing (STEP 10401). The period in which the data management unit 10202 starts processing here should preferably a high speed period, such as a 1 millisecond period, for instance. If the period has not elapsed since its previous processing, the data management unit 10202 ends processing.

If the result of determination at STEP 10401 shows the lapse of the period, the data management unit 10202 updates all the records registered in the data management table 10311 by subtracting from the timer count field 10313 the length of the period (STEP 10402).

Next, the data management unit 10202 extracts records to be deleted. More specifically, the data management unit 10202 determines regarding all the records registered in the data management table 10311 whether or not there is a record of which the timer count field 10313 or the number of transmissions field 10314 is 0 or less (STEP 10403).

If the result of determination at STEP 10403 reveals the presence of any such record, the data management unit 10202 deletes the record or records from the data management table 10310 (STEP 10404).

Then, all the records registered in the data management table 10311 are rearranged in the order of priority level. More specifically, regarding all the records registered in the data management table 10311, it is determined that the priority level is higher in the ascending order of the quotient of division of the number of transmissions field 10314 by the timer count field 10313, the records in the data management table 10311 are rearranged in the order of priority level, and the ranks of priority are recorded in the priority level field 10312 (STEP 10405). If records of which the quotients of division of the number of transmissions field 10314 by the timer count field 10313 are equal are found at STEP 10405, the data management unit 10202 determines the order between or among them according to their respective positions in the time series of registration in the data management table 10311.

A detailed flow of processing by the data management unit 10202 has been described so far.

Figure 22:
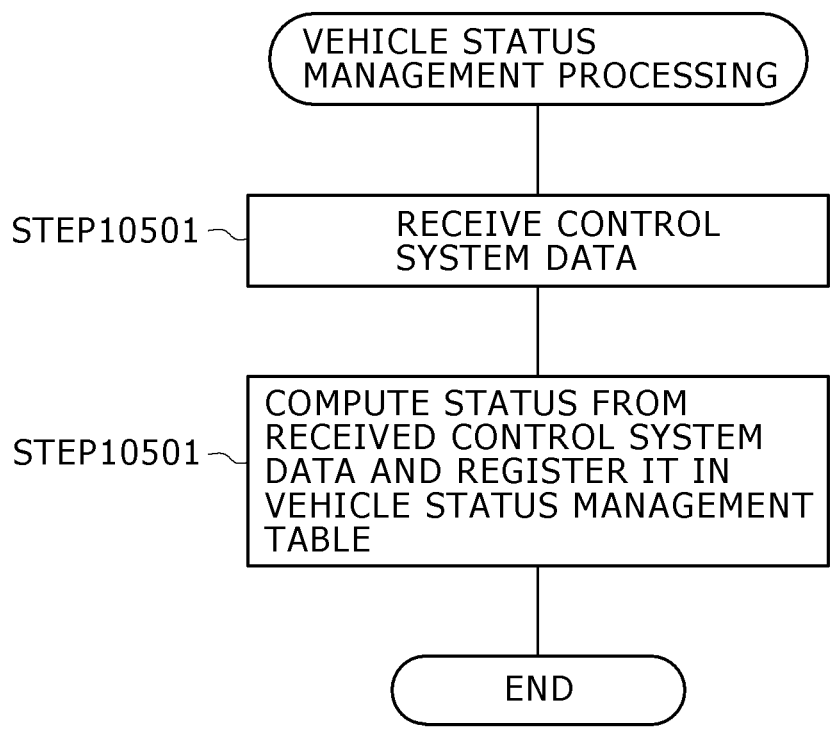
FIG. 22 is a flow chart of vehicle status management processing in the second embodiment of the invention.

Next, FIG. 22 charts the flow of processing by the vehicle status management unit 10203 accomplished in parallel with the data management unit 10202.

The vehicle status management unit 10203 measures the status of the control system network 10111, computes information for assessing the stability of the control system 10110 by using the measured information and records the stability.

More specifically, first the vehicle status management unit 10203 receives the control system data 10220 from the control system network 10111 via the first communication interface 10101 (STEP 10501).

The vehicle status management unit 10203 acquires from the control system data 10220 received at STEP 10501 information matching the item field 10322 of the vehicle status management table 10321 and, on the basis of the result of acquisition of data of pertinent items, registers the information in the status field 10323 of the vehicle status management table 10321 (STEP 10502).

The vehicle status here means the status of the control system indicated by such factors as the average network load factor of the control system network 10111 and the voltages applied to the electronic control units. Generally in the control system 10110, as the plural electronic control units connected to the control system network 10111 are transmitting control data at regular intervals, the average network load factor constantly varies. Conversely, if the variation of the average network load factor becomes inconstant, a delay has presumably arisen in the control period in the electronic control unit. If the on-vehicle gateway device 10100 transmits the control system data 10220 to the control system network 10111 at such timing, the control period in the electronic control unit may be further delayed. In view of this likelihood, the vehicle status management unit 10203 collects, network load factors necessary for determining whether or not the network load factor can be held in a constant range and registers them in the vehicle status management table 10320.

In acquiring a network load factor at STEP 10502 for instance, the vehicle status management unit 10203 may as well count the number of sets of control data received by the vehicle status management unit 10203 within a prescribed length of time recorded in the ROM 1023, divide the count by the presumed number of sets of prescribed control data that are predetermined and received, and figure out the average network load factor on that basis.

Regarding this average network load factor, a control system in which five electronic control units A, B, C, D and E (not shown) are connected to the control system network 10111 is considered for instance. The unit A transmits control data to the control system network 10111 in a 50 millisecond period; the unit B transmits control data to the control system network 10111 in a 100 millisecond period; the unit C transmits control data to the control system network 10111 in a 150 millisecond period; the unit D transmits control data to the control system network 10111 in a 200 millisecond period; and the unit E transmits control data to the control system network 10111 in a 300 millisecond period. In this process, the number of data sets the on-vehicle gateway device 10100 receives from the control system network 10111 in the prescribed 300 milliseconds is 13. The presumed number of sets of data, which is 13, is recorded in the ROM 1023 in advance, and the vehicle status management unit 10203, if it receives 13 sets of data in the prescribed 300 milliseconds, figures out the network load factor to be 100%. On the other hand, if control data fail to be transmitted from the electronic control unit A for a certain period of time on account of a trouble occurring in the electronic control unit A, the number of sets of data received by the on-vehicle gateway device 10100 in the prescribed 300 milliseconds may be 7, instead of the prescribed 13. In this case, the vehicle status management unit 10203 divides 7, which is the received number of sets of data, by 13, which is the supposed number of sets of data received, and figures out the network load factor to be 54%.

Also, the voltages applied to electronic control units or the output voltage from the battery system of the vehicle represent the vehicle status. Generally, when voltages applied to electronic control units become unstable, noise becomes more likely to find its way onto the control system network 10111. Thus, if the on-vehicle gateway device 10100 transmits the control system data 10220 to the control system network 10111 when the voltage is unstable, it may invite the occurrence of a large number of erroneous frames in the control system network 10111. Therefore, the vehicle status management unit 10203 acquires the voltages applied to electronic control units or the output voltage from the battery system of the vehicle, and registers the result into the vehicle status management table 10321. At STEP 10502, acquisition of voltages is accomplished on the basis of voltage information transmitted from, for instance, an electronic control unit adapted to a low voltage.

The flow of processing by the vehicle status management unit 10203 has been described so far.

Figure 23:
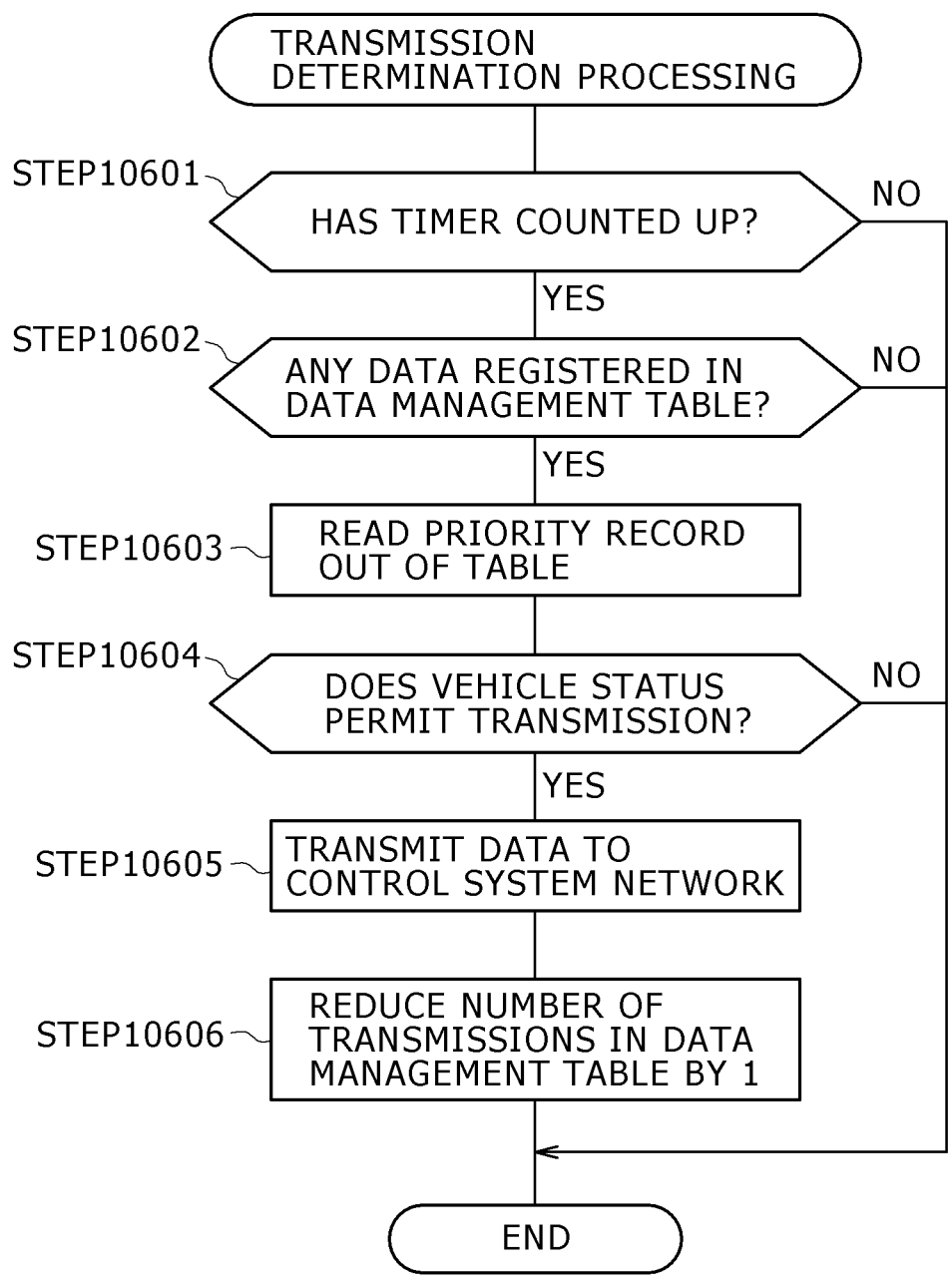
FIG. 23 is a flow chart of transmission determination processing in the second embodiment of the invention.

FIG. 23 charts the flow of processing by the transmission determination unit 10204.

The transmission determination unit 10204 performs processing to transmit records registered in the data management table 10310 periodically in the order of priority level to the control system network 10111.

More specifically, first the transmission determination unit 10204 determines according to timer information from a prescribed timer device whether or not to start its own processing (STEP 10601).

Although it is desirable here for the period in which the transmission determination unit 10204 starts processing is equal to the shortest of the periods of the electronic control units connected to the control system network 10111, it may as well be different. The intention is to avoid an increase in the load factor of the control system network 10111 due to the transmission of the control system data 10220 in an excessive quantity from the on-vehicle gateway device 10100 as well as to prevent extra loads from being imposed on the electronic control units connected to the control system network 10111. If, for instance, 10 milliseconds is the shortest of the transmission periods of the electronic control units, the 10 milliseconds is set as the period in which the transmission determination unit 10204 is to start processing.

The transmission determination unit 10204, if the period has not elapsed since its previous processing, ends processing.

Next, if the result of determination at STEP 10601 shows the lapse of the period since the last processing, the transmission determination unit 10204 checks if any record is registered in the data management table 10310. If no record is registered, the transmission determination unit 10204 immediately ends processing (STEP 10602)

If the presence of any such record is found, the transmission determination unit 10204 reads into a variables area on the RAM 1022 the data highest in priority level in the data management table 10311 (STEP 10603).

Next, the transmission determination unit 10204 determines whether or not the control system 10110 is in a stable status on the basis of the status field 10323 registered in the vehicle status management table 10321 and prescribed thresholds saved on the ROM 1023 or the RAM 1022 and, if it is found to be a stable status, and finds the status permitting transmission of the record taken out at STEP 10603 mentioned above to the control system network 10111 (STEP 10604).

Whether or not the control system 10110 is in a stable status here is determined whether of not the network load factor of the control system network 10111 and the voltages to be applied to the electronic control units are within respectively prescribed ranges registered in advance. Thus, if all the items are found to be within the respectively prescribed ranges, the control system is determined to be in a stable status.

Next, if the result of implementation of STEP 10604 reveals the control system 10110 to be in a stable status, the transmission determination unit 10204 composes the control system data 10220 using, out of the records taken out at STEP 10603, the identifier 10315 as the data identifier 10801 and data at the address indicated by the data pointer 10316 as the control request 10802, and transmits the composed data to the control system network 10111 via the first communication interface 10101 (STEP 10605).

Next, the transmission determination unit 10204 updates the number of transmissions of the record registered in the data management table 10311 by subtracting 1 and ends processing (STEP 10606).

The flow of processing by the transmission determination unit 10204 has been described so far.

The second embodiment of the gateway device, which is a connection device, has been described above.

In the second embodiment, the on-vehicle gateway device 10100 determines the status of the control system 10110 from the control system data 10220 flowing over the control system network 10111 and, only when it finds the status of the control system 10110 to be stable, can transmit the control system data 10220 from the information system 10120 to the control system network 10111. For this reason, the on-vehicle gateway device 10100 can transmit the control system data 10220 to the electronic control units without adversely affecting the control system 10110. Further, even if the control system 10110 cannot perform transmission on account of an unstable status, the vehicle gateway device 10100 holds the data as long as they remain valid instead of discarding them, and can attempt data transmission again in the next transmission period.

For this reason, the information system data 10210 transmitted from the information system 10120 to the control system 10110 can be safely relayed, and the risk of inviting instability of the control system 10110 can be reduced.

Further, though in the second embodiment the transmission determination unit 10204 determines at STEP 10604 whether to transmit or not according to whether or not the values in the vehicle status management table 10321 are within the prescribed ranges registered in advance, this is not the only way to make this determination.

For instance, even if the values in the vehicle status management table 10321 are not within the prescribed ranges registered in advance, transmission to the control system data 10220 may be permitted as an exceptional case if a specific condition is met.

The specific condition may be, for instance, immediately after all the electronic control units connected to the control system network 10111 simultaneously transmitted control data, because the load on the network is usually minimized in such a case.

An example taken up with reference to the second embodiment will be taken up again, and its principle will be described below with reference to FIG. 24.

Figures 24, 25:
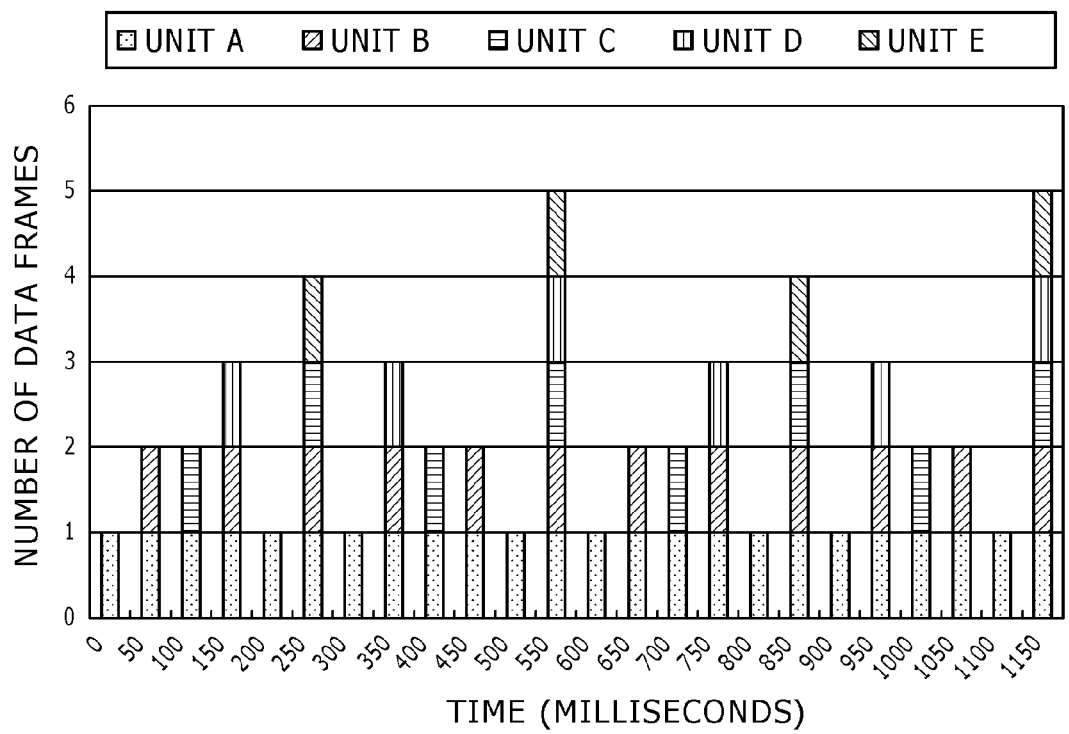
FIG. 24 simulates the data frame quantity flowing in the control system network.
FIG. 25 shows the configuration of a vehicle status management table in a third embodiment of the invention.

FIG. 24 is a graph simulating the data frame quantity flowing in each of the transmission sources (units A through E) in the control system network, the number of data frames being counted in 50 millisecond units. The X axis of this graph represents the length of time (in milliseconds) and the Y axis, the number of data frames.

The least common multiples of the transmission periods of these electronic control units A, B, C, D and E here is 600 milliseconds. This means that all the electronic control units arrive at data transmission timing once in every 600 milliseconds. Immediately after that, the load on the network can be expected to reach its minimum. For instance, as shown in FIG. 25, regarding the simulated values, when the on-vehicle gateway device 10100 has been able to receive 5 sets of data from the control system network 10111 (when every one of the electronic control units A through E has transmitted 1 data frame), such as somewhere between 550 milliseconds and 600 milliseconds within the period, the load on the control system network 10111 is guaranteed to be at its minimum until the unit B having the second shortest period transmits data next time, namely between 601 milliseconds and 650 milliseconds.

Because of the principle described above, a configuration which permits transmission under a specific condition at STEP 10604, namely in a period immediately after all the electronic control units connected to the control system network 10111 transmitted control data at the same time, can be adopted as well.

Further in the second embodiment, though the transmission determination unit 10204 reads out at STEP 10603 one record which is the highest in the priority level field 10312, this is not the only available option.

For instance, plural records may be read out in the sequence of the priority level field 10312, and plural sets of the control system data 10220 may be transmitted.

However, when plural records are to be transmitted collectively, unless the largest permissible number of records that can be transmitted is prescribed in advance, the bulk transmission of a large number of records may invite an excessive flow rate over the control system network 10111 to destabilize the control system 10110.

A third embodiment having a configuration to solve this problem will be described below with reference to FIGS. 25 and 14.

In the third embodiment, which is similar to the second embodiment in basic configuration, the vehicle status management unit 10203 and the transmission determination unit 10204, which are functional units of the on-vehicle gateway device 10100, differ in the particulars of processing. Also, the presence of a record 10330, whose item field 10322 is the "quantity of data transmitted, in the vehicle status management table 10320 on the RAM 1022 as shown in FIG. 25 is another difference.

The operation of the vehicle status management unit 10203 and the transmission determination unit 10204 in the third embodiment will be described below with reference to FIGS. 25 and 14.

The vehicle status management unit 10203 counts the number of sets of data flowing over the control system network 10111 in addition to the network load factor and voltages at its STEP 10502. The result of counting is recorded in the status 10323 column in the record 10330 shown in FIG. 25.

Figure 26:
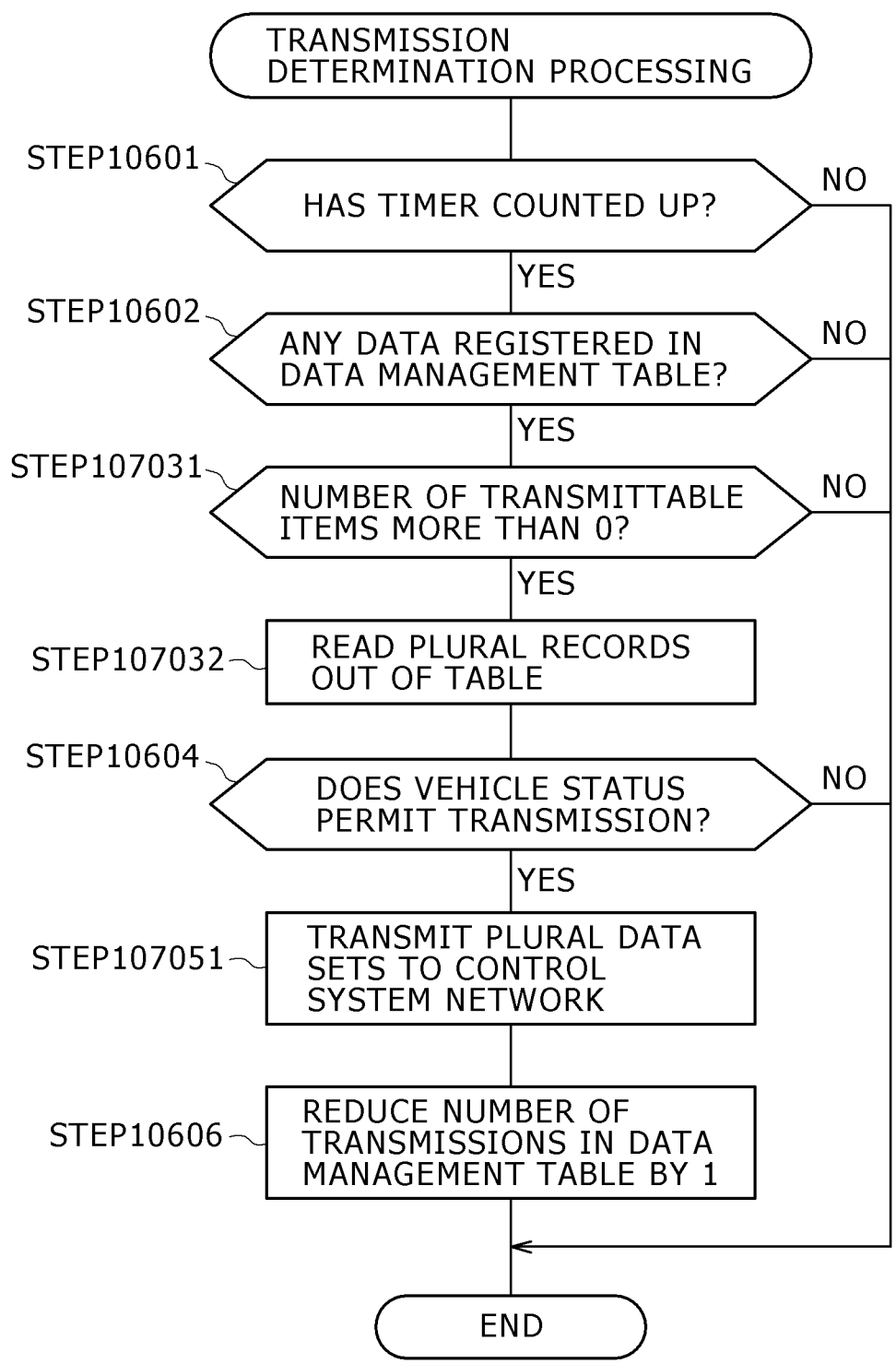
FIG. 26 is a flow chart of transmission determination processing in the third embodiment of the invention.

As shown in FIG. 26, when the result of STEP 10602 is YES, the transmission determination unit 10204 determines on the basis of a prescribed threshold (not shown) stored in the storage unit 10252 whether or not the balance of subtracting the value of the status field 10323 column in the record 10330 from the value of the record 10330, which is the counted the number of sets of data, is greater than 0 (STEP 107031).

If the result of STEP 107031 reveals a greater balance than 0, the difference is determined to be the number of records to be transmitted, and as many records as that number are read out of the data management table 10310 into a variables area on the storage unit 10252 in the order of priority level. If the difference is 0 or minus, the transmission determination processing is ended (STEP 107032).

The transmission determination unit 10204 composes the control system data 10220 from a variables area equivalent to the number representing the difference at STEP 107051, and transmits two sets of the control system data 10220 to the control system network 10111 via the first communication interface 10101.

For instance, in the control system network 10111 over which an aggregate of 13 data frames in a prescribed length of time (in 300 milliseconds), 15 is set as the prescribed threshold and stored on the ROM 1023. Then the on-vehicle gateway device 10100 is actuated and, if 13 data frames are found to have flowed in an aggregate as a result of counting the number of data frames of the vehicle status management unit 10203 by the control system network 10111 in a prescribed length of time (in 300 milliseconds), the vehicle status management unit 10203 causes "13" to be stored in the status column of the record 10330 in the vehicle status management table 10320. The transmission determination unit 10204 at its STEP 107031 figures out (+) 2, which is the difference from the prescribed threshold 15, as the number of transmittable records and at the next STEP 107031 reads out two records into the variables area.

The transmission determination unit 10204, if it determines at STEP 10604 the status allows transmission to the control system network 10111, composes the control system data 10220 from the two records at STEP 107051, and transmits the two sets of the control system data 10220 to the control system network 10111 via the first communication interface 10101.

The third embodiment so far described enables plural data sets from the on-vehicle gateway device 10100 to the control system network 10111, resulting in improve transmission performance compared with the second embodiment and moreover preventing the control system 10110 from being destabilized.

The on-vehicle gateway devices described as the second embodiment, its modifications and the third embodiment cannot only be treated as commercial products by themselves but also as on-vehicle gateway devices incorporated into vehicles.

Preferred embodiments of the present invention have been hitherto described.

What is claimed is:

1. A connection device for connecting to a network of a control system and an external device of the network, comprising:
    a memory circuit to store data transmitted from the external device to the control system and a control circuit,
    wherein the control circuit is configured to:
    determine whether or not the control system is stable,
    when the control system is determined to be stable, determine whether or not to transmit the data based on a number of transmissions of the data or a validity duration of the data or a priority level of the data stored in the memory circuit, and
    when the control system is determined to be stable and the data is determined to be transmitted, transmit the data stored in the memory circuit to the control system.

2. The connection device according to claim 1, wherein the control circuit determines that the control system is stable if the network load factor of the network is within a prescribed range.

3. The connection device according to claim 1, wherein the control circuit determines that the control system is stable if the voltage supplied to the control system is within a prescribed range.

4. The connection device according to claim 1, wherein the control circuit judges whether or not the control system is stable in a predetermined period and, when a quantity of data flowing over the network in one period exceeds a prescribed threshold, the control circuit determines that the control system will be stable in a period immediately following the current one period.

5. The connection device according to claim 1, wherein:
    the data transmitted from the external device to the control system and the number of the transmissions of the data are stored in the memory circuit, and
    the control circuit determines whether or not the control system is stable in a predetermined period and subtracts from the number of transmissions every time it performs transmission processing of the result of the determination.

6. The connection device according to claim 5, wherein the control circuit, when the number of transmissions has become 0, deletes, from the memory circuit, data of 0 as the number of transmissions.

7. The connection device according to claim 1, wherein:
    the memory circuit stores the data transmitted from the external device to the control system and information that specifies the validity duration of the data, and
    the control circuit determines whether or not the control system is stable in a predetermined period and subtracts the length of the predetermined period from the validity duration.

8. The connection device according to claim 7, wherein the control circuit, when the validity duration has expired, deletes, from the memory circuit, the data of which the validity duration has expired.

9. The connection device according to claim 1, wherein:
    the data transmitted from the external device to the control system and information that specifies the priority level of the data are stored in the memory circuit, and
    the control circuit, if it is determined that the control system is stable, transmits data stored in the memory circuit in a descending order of the priority level to the control system.

10. The connection device according to claim 9, wherein the priority level is set in an ascending order of a quotient of division of the validity duration of the data transmitted from the external device to the control system by the number of transmissions.

\* \* \* \* \*